(12) United States Patent
Zhang et al.

(10) Patent No.: US 12,425,643 B2
(45) Date of Patent: Sep. 23, 2025

(54) DERIVATION OF AFFINE MERGE CANDIDATES WITH LINEAR REGRESSION FOR VIDEO CODING

(71) Applicant: QUALCOMM Incorporated, San Diego, CA (US)

(72) Inventors: Yan Zhang, San Diego, CA (US); Han Huang, San Diego, CA (US); Vadim Seregin, San Diego, CA (US); Muhammed Zeyd Coban, Carlsbad, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 27 days.

(21) Appl. No.: 18/188,908

(22) Filed: Mar. 23, 2023

(65) Prior Publication Data
US 2023/0328276 A1     Oct. 12, 2023

Related U.S. Application Data

(60) Provisional application No. 63/366,106, filed on Jun. 9, 2022, provisional application No. 63/362,808, filed on Apr. 11, 2022.

(51) Int. Cl.
| | | |
|---|---|---|
| *H04N 19/573* | (2014.01) | |
| *H04N 19/105* | (2014.01) | |
| *H04N 19/139* | (2014.01) | |
| *H04N 19/159* | (2014.01) | |
| *H04N 19/176* | (2014.01) | |
| *H04N 19/52* | (2014.01) | |

(52) U.S. Cl.
CPC ......... *H04N 19/573* (2014.11); *H04N 19/105* (2014.11); *H04N 19/139* (2014.11); *H04N 19/159* (2014.11); *H04N 19/176* (2014.11); *H04N 19/52* (2014.11)

(58) Field of Classification Search
None
See application file for complete search history.

(56) References Cited

U.S. PATENT DOCUMENTS

| | | |
|---|---|---|
| 2021/0243476 A1 | 8/2021 | Ko et al. |
| 2021/0266591 A1 | 8/2021 | Zhang et al. |
| | (Continued) | |

FOREIGN PATENT DOCUMENTS

| | | |
|---|---|---|
| WO | 2020180704 A1 | 9/2020 |

OTHER PUBLICATIONS

Ghaznavi-Youvalari, R., "Regression-Based Motion Vector Field for Video Coding", IEEE Transactions on Circuits and Systems for Video Technology, vol. 31, No. 5, (May 2021) (Year: 2021).*

(Continued)

*Primary Examiner* — Lindsay J Uhl
(74) *Attorney, Agent, or Firm* — Shumaker & Sieffert, P.A.

(57) ABSTRACT

A method for coding a block of video data using affine mode includes determining a refined affine model for the current block of video data from a linear regression process using a base motion vector field and a guidance motion vector field as inputs to the linear regression process. The method further includes determining affine merge candidates for the current block using the refined affine model, and coding the current block of video data using the affine merge candidates.

46 Claims, 18 Drawing Sheets

(56) References Cited

U.S. PATENT DOCUMENTS

| | | | |
|---|---|---|---|
| 2021/0360277 | A1 | 11/2021 | Jeong et al. |
| 2021/0385483 | A1* | 12/2021 | Liu .................... H04N 19/513 |
| 2022/0078488 | A1 | 3/2022 | Leleannec et al. |
| 2022/0210462 | A1* | 6/2022 | Luo ..................... H04N 19/55 |

OTHER PUBLICATIONS

Ghaznavi-Youvalari R., et al., "CE2: Merge Mode with Regression-Based Motion Vector Field (Test 2.3.3)", JVET-M0302, Joint Video Experts Team (JVET) of ITU-T SG 16 WP 3 and ISO/IEC JTC 1/SC 29/WG 11, 13th Meeting: Marrakech, MA, No. JVET-M0302, Jan. 9, 2019-Jan. 18, 2019, Jan. 2, 2019, XP030200275.

International Search Report and Written Opinion—PCT/US2023/016231—ISA/EPO—Jun. 30, 2023.

Chen J., et al., "Algorithm Description for Versatile Video Coding and Test Model 9 (VTM 9)", 130. MPEG Meeting, Mar. 20, 2020-Apr. 24, 2020, Alpbach, (Motion Picture Expert Group or ISO/IEC JTC1/SC29/WG11), No. m53984, 18th JVET Meeting, JVET of ITU-T SG 16 WP 3 and ISO/IEC JTC 1/SC 29/WG 11, Apr. 15-24, 2020, JVET-R2002-v2, Jun. 15, 2020 (Jun. 15, 2020), XP030289596, 97 Pages.

Chen W., et al., "AHG12: Non-Adjacent Spatial Neighbors for Affine Merge Mode", JVET-X0151-v2, Joint Video Experts Team (JVET) of ITU-T SG 16 WP 3 and ISO/IEC JTC 1/SC 29, 24th Meeting, by teleconference, Oct. 6-15, 2021, pp. 1-4.

Chen W., et al., "EE2-2.7, 2.8, 2.9: History-Parameter-Based Affine Model Inheritance and Non-Adjacent Affine Mode", JVET-Z0139-v1, Joint Video Experts Team (JVET) of ITU-T SG 16 WP 3 and ISO/IEC JTC 1/SC 29, 26th Meeting, by teleconference, Apr. 20-29, 2022, pp. 1-10.

Coban M., et al., "Algorithm Description of Enhanced Compression Model 2 (ECM 2)", 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22.

Ghaznavi-Youvalari R., et al., "CE4-related: Merge Mode with Regression based Motion Vector Field (RMVF)", JVET-L0171, Nokia Technologies, 2018, pp. 1-8.

Ghaznavi-Youvalari R., et al., "Regression-Based Motion Vector Field for Video Coding", IEEE Transactions on Circuits and Systems for Video Technology, vol. 31, No. 5, May 2021, pp. 2034-2038.

Hu N., et al., "EE2-5: Adaptive filter Shape Switch and Using Samples before Deblocking Filter for Adaptive Loop Filter", JVET-AA0095-v1, Joint Video Experts Team (JVET) of ITU-T SG 16 WP 3 and ISO/IEC JTC 1/SC 29, 27th Meeting, by teleconference, Jul. 13-22, 2022, pp. 1-8.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Laroche G., et al., "EE2-2.5: ARMC Improvements", JVET-AA0092-v1, Joint Video Experts Team (JVET) of ITU-T SG 16 WP 3 and ISO/IEC JTC 1/SC 29, 27th Meeting, by teleconference, Jul. 13-22, 2022, pp. 1-3.

Seregin V., et al., "Exploration Experiment on Enhanced Compression beyond VVC capability (EE2)", JVET-Z2024-v2, Joint Video Experts Team (JVET) of ITU-T SG 16 WP 3 and ISO/IEC JTC 1/SC 29, 26th Meeting, by teleconference, Apr. 20-29, 2022, pp. 1-12.

Zhang K., et al., "An Improved Framework of Affine Motion Compensation in Video Coding", IEEE Transactions on Image Processing (Early Access), Oct. 22, 2018, pp. 1-13.

Zhang K., et al., "EE2-3.12-Related: Extensions of History-Parameter-Based Affine Model Inheritance", JVET-Y0161- 3, Joint Video Experts Team (JVET) of ITU-T SG 16 WP 3 and ISO/IEC JTC 1/SC 29, 25th Meeting, by teleconference, Jan. 12-21, 2022, pp. 1-4.

Zhang Y., et al., "EE2-2.1: Regression Based Affine Candidate Derivation", JVET-AA0107-v2, Joint Video Experts Team (JVET) of ITU-T SG 16 WP 3 and ISO/IEC JTC 1/SC 29, 27th Meeting, by teleconference, Jul. 13-22, 2022, pp. 1-5.

Zhang Y., et al., "EE2-Related: Regression Based Affine Candidate Derivation", JVET-Z0125-v2, Joint Video Experts Team (JVET) of ITU-T SG 16 WP 3 and ISO/IEC JTC 1/SC 29, 26th Meeting, by teleconference, Apr. 20-29, 2022, pp. 1-5.

* cited by examiner

DERIVATION OF AFFINE MERGE CANDIDATES WITH LINEAR REGRESSION FOR VIDEO CODING

This application claims the benefit of U.S. Provisional Application No. 63/362,808, filed Apr. 11, 2022, and U.S. Provisional Application No. 63/366,106, filed Jun. 9, 2022, the entire content of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for encoding and decoding video data. In particular, this disclosure describes techniques for deriving affine merge candidates using linear regression techniques. In some examples, affine merge candidates may be derived from the affine model of a neighboring block that is also coded using affine mode. However, such a neighboring block may not always be spatially close to the current block. As such, in some circumstances, that affine model of the neighboring block may not be an optimal match to the actual motion present in the block to be coded.

To help address this potential deficiency, a video coder may use another set of motion information to refine the affine model to be used for the current block. The affine model of the neighboring block may be used to determine a motion vector field for the current block. Such a motion vector field may be referred to as a base motion vector field. This base motion vector field may be refined by another motion vector field that may more accurately represent the motion of the current block. This other motion vector field may be referred to as a guidance motion vector field. In one example, the guidance motion vector field may include motion information for a plurality of sub-blocks that are adjacent to the current block. Because these sub-blocks are spatially close to the current block, the motion information associated with the adjacent sub-blocks may more accurately reflect the motion of the current block.

The video coder may then use the base motion vector field and the guidance motion vector field as inputs to a multivariate linear regression process. The linear regression process produces a refined affine model for the current block that may then be used to determine affine merge candidates for the current block. Such affine merge candidates may be more accurate representations of the motion of the current block, thus allowing for greater compression efficiency and/or reduced distortion.

In one example, a method includes receiving a current block of video data to be coded (e.g., encoded or decoded) using an affine merge mode, determining a refined affine model for the current block of video data from a linear regression process using a base motion vector field and a guidance motion vector field as inputs to the linear regression process, determining affine merge candidates for the current block using the refined affine model, coding the current block of video data using the affine merge candidates.

In another example, a device includes a memory and one or more processors configured to receive a current block of video data to be coded using an affine merge mode, determine a refined affine model for the current block of video data from a linear regression process using a base motion vector field and a guidance motion vector field as inputs to the linear regression process. determine affine merge candidates for the current block using the refined affine model, and code the current block of video data using the affine merge candidates.

In another example, a device includes means for receiving a current block of video data to be coded using an affine merge mode, means for determining a refined affine model for the current block of video data from a linear regression process using a base motion vector field and a guidance motion vector field as inputs to the linear regression process, means for determining affine merge candidates for the current block using the refined affine model, means for coding the current block of video data using the affine merge candidates.

In another example, a computer-readable storage medium is encoded with instructions that, when executed, cause a programmable processor to receive a current block of video data to be coded using an affine merge mode, determine a refined affine model for the current block of video data from a linear regression process using a base motion vector field and a guidance motion vector field as inputs to the linear regression process. determine affine merge candidates for the current block using the refined affine model, and code the current block of video data using the affine merge candidates.

The details of one or more examples are set forth in the accompanying drawings and the description below. Other features, objects, and advantages will be apparent from the description, drawings, and claims.

DETAILED DESCRIPTION

The motion information for affine coded blocks may be predicted at the sub-block level. A video coder may construct a sub-block merge candidate list that includes possible candidate motion information for the sub-blocks of a block. One or more of the merge candidates in the list are inherited affine merge candidates. Inherited affine merge candidates are candidates that are extrapolated from the control point motion vectors (CPMVs) of neighbor blocks coded using affine mode. The affine merge candidates are essentially a linear model and each motion vector within the affine block can be derived from a linear model given the coordinates of the block.

In some examples, such neighbor blocks are spatially near, or even adjacent the block being coded. However, in other examples, non-adjacent or history-based (e.g., spatially distant) neighbor blocks are used as the inherited affine merge candidates. In general, the design of sub-block merge mode is made with the assumption that the motion information associated with the candidates in the merge candidate list generally approximates the motion expected to be seen in the current block being coded. However, this may not be true for large neighbor block and/or spatially distant blocks, including spatially distant affine blocks used as inherited affine merge candidates.

This disclosure describes techniques that may improve the accuracy of the affine model for inherited affine candidates. In one example, a video coder may use another set of motion information to refine the affine model to be used for the current block. The affine model of the neighboring block may be used to determine a motion vector field for the sub-blocks of the current. Such a motion vector field may be referred to as a base motion vector field. This base motion vector field may be refined by another motion vector field that may more accurately represent the motion of the current block. This other motion vector field may be referred to as a guidance motion vector field. In one example, the guidance motion vector field may include motion information for a plurality of sub-blocks that are adjacent to the current block. Because these sub-blocks are spatially close to the current block, the motion information associated with the adjacent sub-blocks may more accurately reflect the motion of the current block.

The video coder may then use the base motion vector field and the guidance motion vector field as inputs to a multi-variate linear regression process. The linear regression process produces a refined affine model for the current block that may then be used to determine affine merge candidates for the current block. Such affine merge candidates may be more accurate representations of the motion of the current block, thus allowing for greater compression efficiency and/or reduced distortion.

Figure 1:
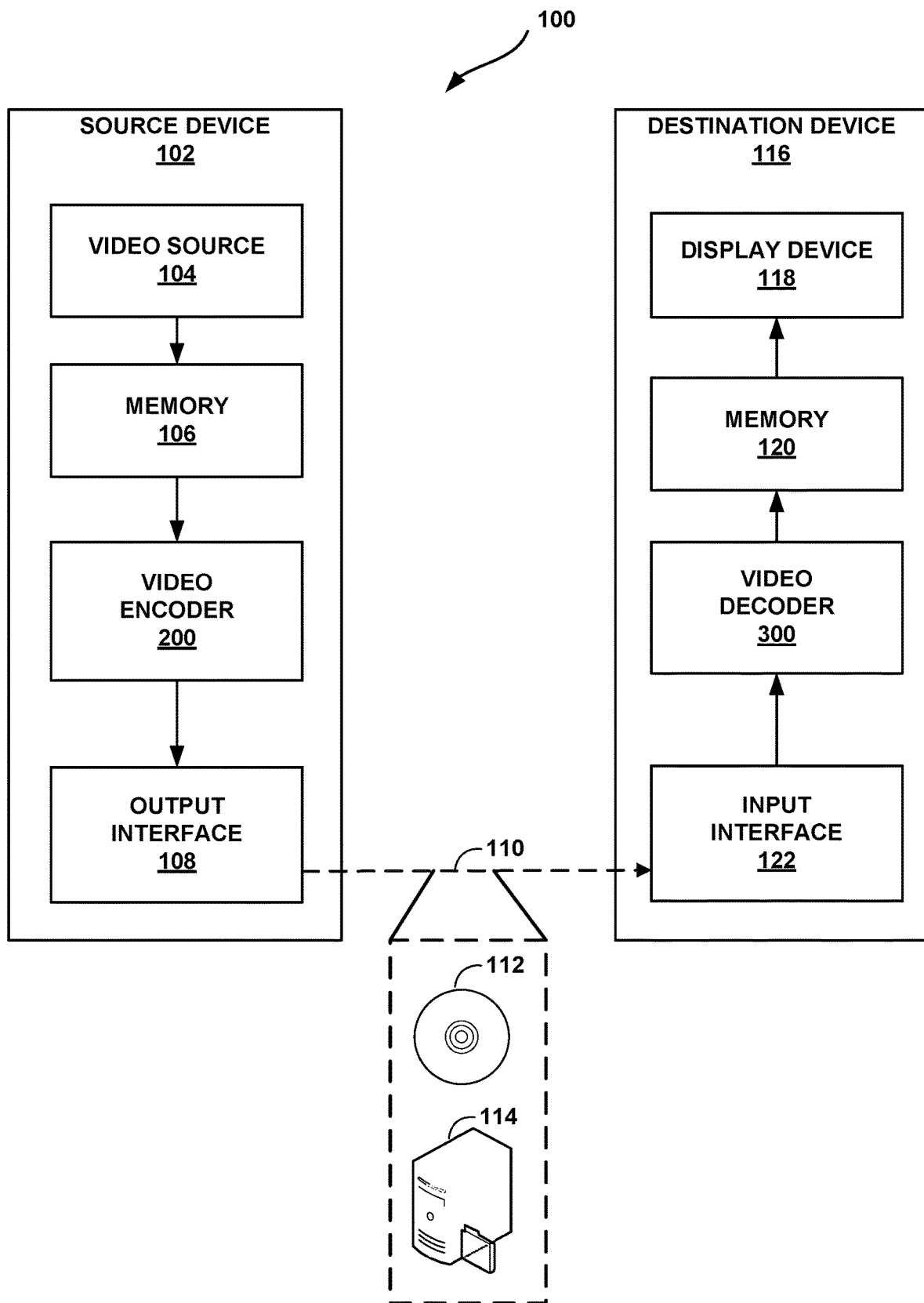
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for deriving affine merge candidates with linear regression. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for deriving affine merge candidates with linear regression. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use an affine merge mode.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an interprediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Starting in April 2021, JVET has been developing an Enhanced Compression Model (ECM) software to improve compression capability beyond VVC. The set of coding tools in the ECM software encompass functional blocks in the hybrid video coding framework, including intra prediction, inter prediction, transform and coefficient coding, in-loop filtering, and entropy coding.

In accordance with the techniques of this disclosure, as will be described in more detail below, video encoder 200 and video decoder 300 may be configured receive a current block of video data to be coded using an affine merge mode, determine a refined affine model for the current block of video data from a linear regression process using a base motion vector field and a guidance motion vector field as inputs to the linear regression process, determine affine merge candidates for the current block using the refined affine model, and code the current block of video data using the affine merge candidates.

The techniques of this disclosure may be applied to ECM and extensions of state of the art video codecs, such as VVC, AV1, etc.

1.1 Sub-Block-Based Temporal Motion Vector Prediction (SbTMVP)

Figure 2:
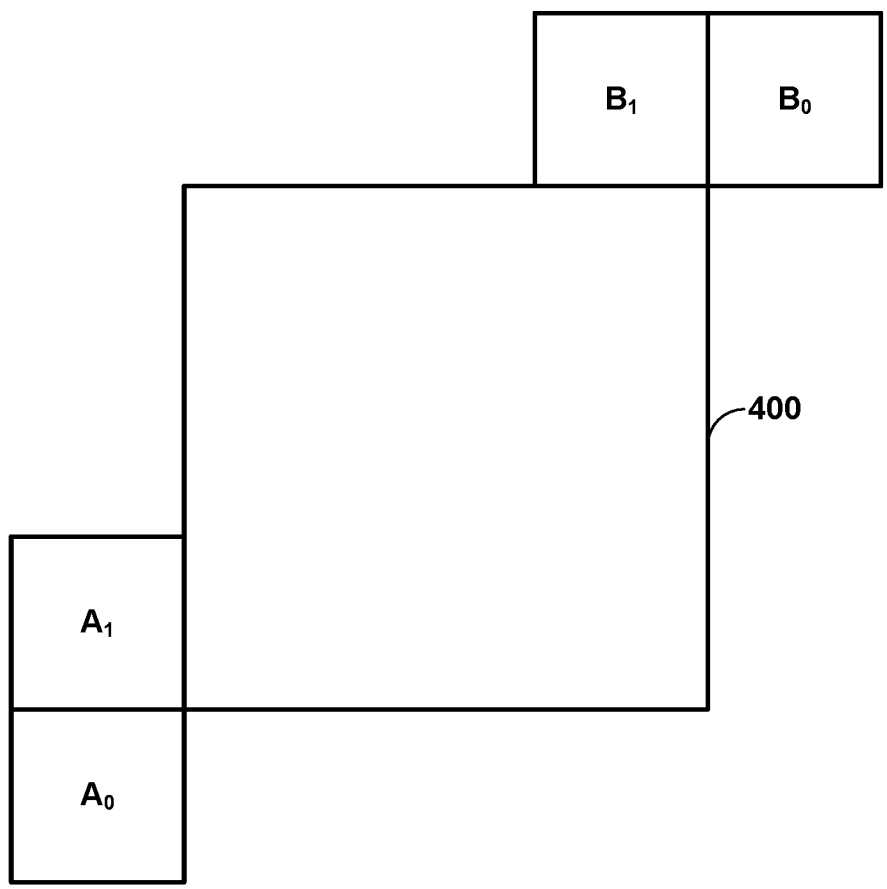
FIG. 2 is a conceptual diagram illustrating example spatial neighboring blocks for sub-block-based temporal motion vector prediction.
Figure 3:
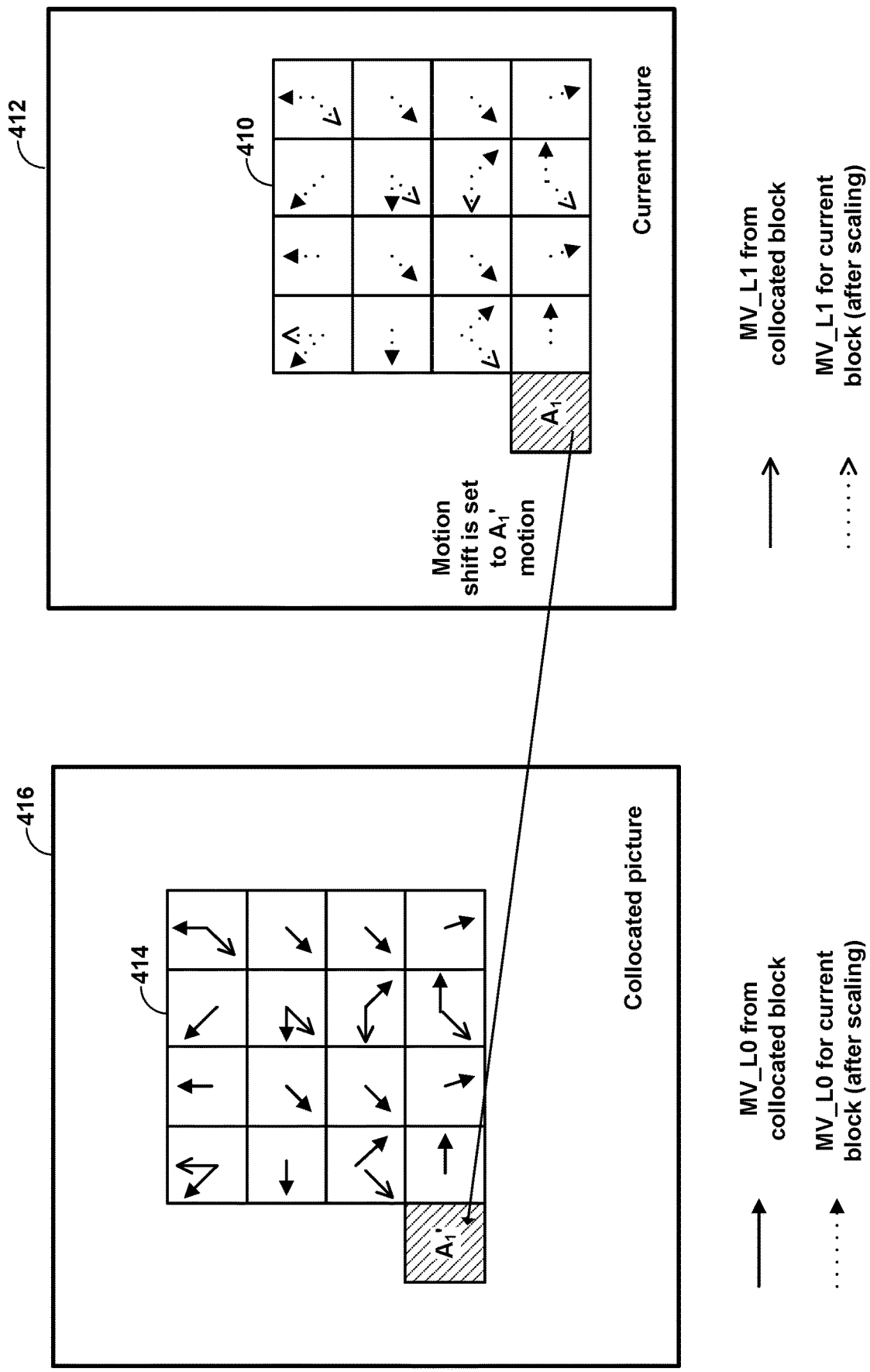
FIG. 3 is a conceptual diagram illustrating an example of motion field derivation for sub-block-based temporal motion vector prediction.

Example SbTMVP techniques may include the prediction of the motion vectors of sub-CUs within a current CU (e.g., in two steps), as illustrated in FIG. 2 and FIG. 3. FIG. 2 is a conceptual diagram illustrating example spatial neighboring blocks for sub-block-based temporal motion vector prediction. FIG. 3 is a conceptual diagram illustrating an example of motion field derivation for sub-block-based temporal motion vector prediction.

In a first step, video encoder 200 and/or video decoder 300 examines the spatial neighbor A1 of current block 400 of FIG. 2. If neighbor block A1 is associated with a motion vector that uses the collocated picture as its reference picture, video encoder 200 and/or video decoder 300 selects this motion vector as the motion shift to be applied. If no such motion is identified, then video encoder 200 and/or video decoder 300 sets the motion shift to (0, 0).

In a second step, video encoder 200 and/or video decoder 300 adds the motion shift identified in the first step to the coordinates of the current block to obtain sub-CU-level motion information (e.g., motion vectors and reference indices) from the collocated picture, as shown in FIG. 3. In FIG. 3, the sub-block motion vectors (MV_L0 and MV_L1) of the current block 410 of current picture 412 are scaled based on motion information obtained from collocated block 414 in collocated picture 416. The example in FIG. 3 is shown with the assumption that the motion shift is set to the motion information of neighbor block $A_1'$ of collocated block 414. After the motion information of the collocated sub-CU is identified, the motion information is converted to the motion vectors and reference indices of the current sub-CU in a similar way as the TMVP process of VVC, where temporal motion scaling is applied to align the reference pictures of the temporal motion vectors to those of the current CU.

Video encoder 200 and video decoder 300 may add the SbTMVP predictor as the first entry to the list of sub-block based merge candidates, which are followed by the affine merge candidates. SbTMVP differs from TMVP in the following two main aspects:

(1) TMVP includes predicting motion at the CU level, but SbTMVP includes predicting motion at the sub-CU level;

(2) Whereas TMVP includes fetching the temporal motion vectors from the collocated block in the collocated picture (the collocated block is the bottom-right or center block relative to the current CU), SbTMVP includes applying a motion shift before fetching the temporal motion information from the collocated picture, where the motion shift is obtained from the motion vector from one of the spatial neighboring blocks of the current CU.

1.2 Sub-Block Merge Candidate List

In one example, the following four types of sub-block merge candidates may be used, in order, to form a sub-block merge candidate list, where the first entry is an SbTMVP, candidate and the other entries are affine merge candidates: SbTMVP candidates, inherited affine merge candidate (I-AffineMVP), constructed affine merge candidates (C-AffineMVP), and zero motion vectors (MVs).

SbTMVP candidates may be derived as described above in Section 1.1.

Figure 4:
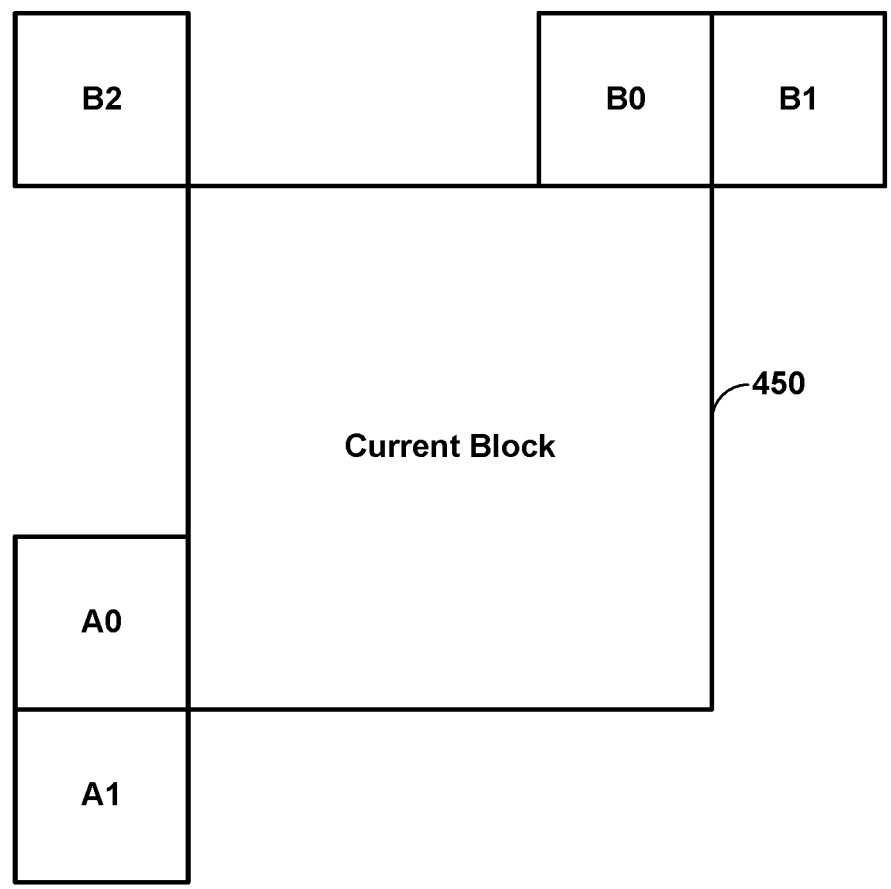
FIG. 4 is a conceptual diagram illustrating example positions of spatial inherited affine merge candidates.

Inherited affine merge candidates (I-AffineMVP) are candidates that are extrapolated from the control point motion vectors (CPMVs) of the neighbour CUs. In one example, there are a maximum of two inherited affine candidates, which are derived from the affine motion model of the neighboring blocks. The two inherited affine candidates include one inherited affine candidate from a left neighboring CU and one inherited affine candidates from an above neighboring CU. The candidate block positions are shown in FIG. 4. FIG. 4 is a conceptual diagram illustrating example positions of spatial inherited affine merge candidates relative to current CU 450. For the left predictor, the scan order is A0→A1, wherein A0 and A1 are left neighboring CUs. For the above predictor, the scan order is B0→B1→B2, where B0, B1, and B2 are above neighboring CUs. Video encoder 200 and video decoder 300 may be configured to select only the first inherited candidate from each group. In one example, video encoder 200 and video decoder 300 are configured to not perform a pruning check between the two inherited candidates. When a neighboring affine CU that contains the scanning position is identified, its control point motion vectors from the identified affine CU are used to derive the CPMVs of an affine merge candidate of the current CU.

Figure 5:
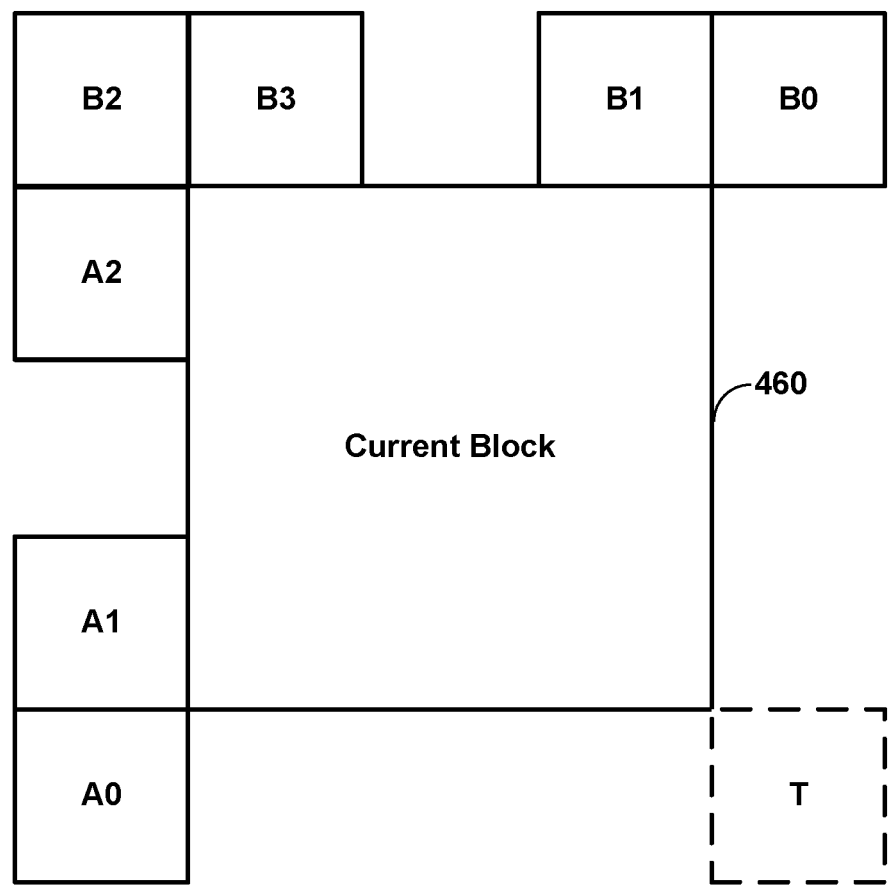
FIG. 5 is a conceptual diagram illustrating example locations of candidate positions for constructed affine merge mode.

Constructed affine merge candidates (C-AffineMVP) are candidates that are derived using the translational MVs of the neighbour CUs. A constructed affine candidate means the candidate is constructed by combining the neighbor translational motion information of each control point. The motion information for the control points are derived from the specified spatial neighbors and temporal neighbor shown in FIG. 5. FIG. 5 is a conceptual diagram illustrating example locations of candidate positions relative to current block 460 for constructed affine merge mode. $CPMV_k$ (k=1, 2, 3, 4) represents the k-th control point motion vector. For $CPMV_1$, the B2→B3→A2 neighboring blocks are checked, in order, and the MV of the first available block is used. For $CPMV_2$, the B1→B0 neighboring blocks are checked, in order. For $CPMV_3$, the A1→A0 neighboring blocks are checked, in order. A TMVP is used as $CPMV_4$ if the TMVP is available.

The following combinations of control point MVs are used to construct affine merge candidates in a given order, with at most six different candidates: {$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}. The combination of three CPMVs constructs a 6-parameter affine merge candidate and the combination of two CPMVs constructs a 4-parameter affine merge candidate. To avoid a motion scaling process, if the reference indices of control points are different, the related combination of control point MVs is discarded.

A zero MV candidate is added after inherited affine merge candidates and constructed affine merge candidate are checked if the list is still not full. Multiple zero MVs may be inserted until the list is full (e.g., the list of candidates reaches a predetermined size).

1.3 Adaptive Reordering of Merge Candidates (ARMC)

In one example of ECM, video encoder 200 and video decoder 300 may be configured to adaptively reorder merge candidates using template matching (TM). In one example, the reordering method is applied to the regular merge candidate list, the TM merge candidate list, and the affine merge candidate list (e.g., sub-block merge candidate list excluding the SbTMVP candidate). For the TM merge mode, merge candidates are reordered before a TM refinement process.

After a merge candidate list is constructed, merge candidates are divided into several subgroups. In one example, the subgroup size is set to 5 for regular merge mode and TM merge mode. The subgroup size is set to 3 for affine merge mode. Merge candidates in each subgroup are reordered ascendingly according to cost values based on TM. For simplification, merge candidates in the last, but not the first subgroup, are not reordered.

The TM cost of a merge candidate is measured by the sum of absolute differences (SAD) between samples of a template of the current block and their corresponding reference samples. The template comprises a set of reconstructed samples neighboring to the current block. Reference samples of the template are located by the motion information of the merge candidate.

Figure 6:
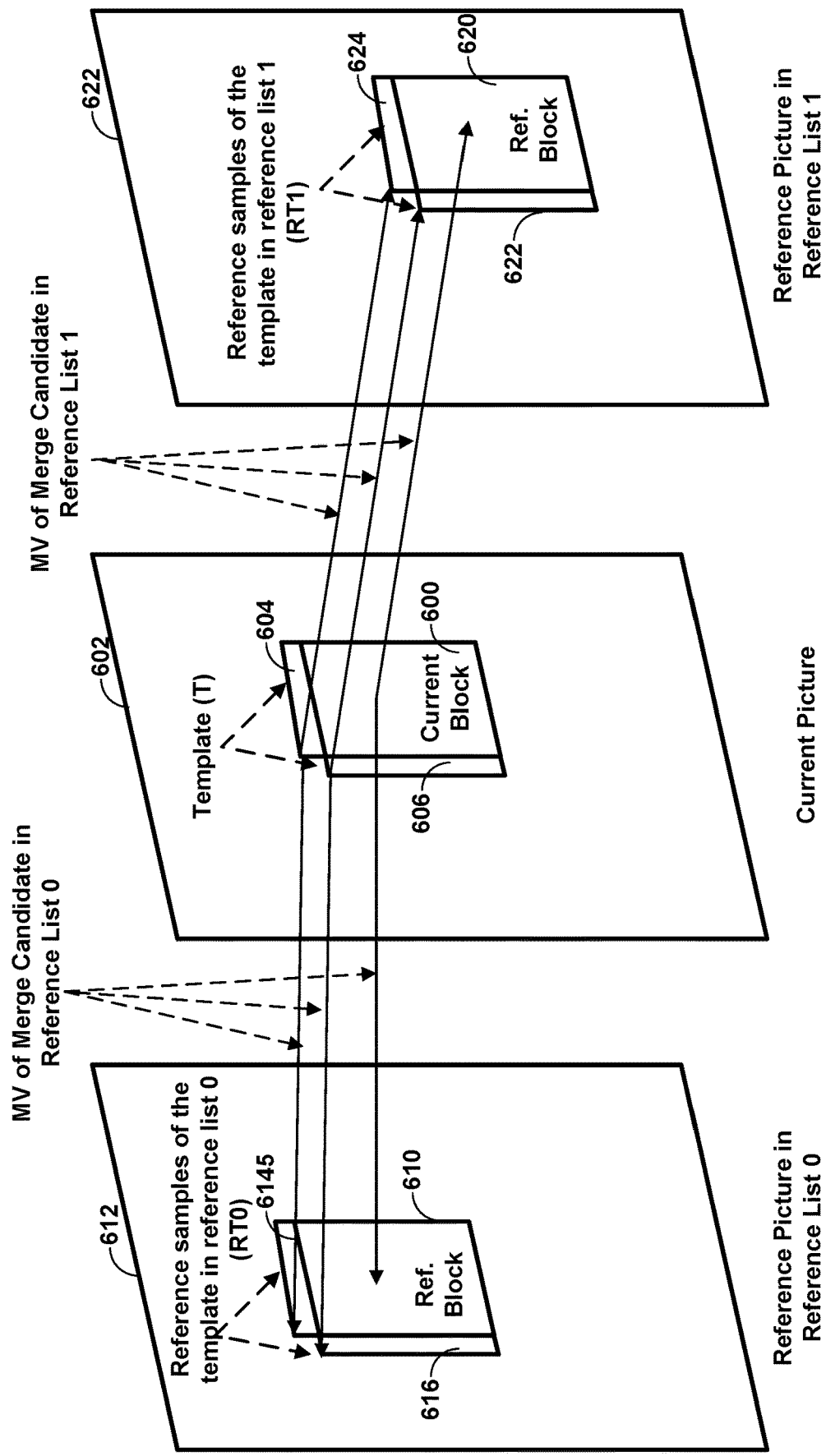
FIG. 6 is a conceptual diagram illustrating example templates and reference samples for adaptive reordering of merge candidates.

When a merge candidate utilizes bi-directional prediction, the reference samples of the template of the merge candidate are also generated by bi-prediction, as shown in FIG. 6. FIG. 6 is a conceptual diagram illustrating example templates and reference samples for adaptive reordering of merge candidates. Current block 600 of current picture 602 has an above template 604 and a left template 606. Reference block 610 of reference picture 612 in reference list 0 is identified using the motion vector of a merge candidate in reference list 0. Reference samples of the above template 614 and the left template 616 are obtained (RT0). Similarly, reference block 620 of reference picture 622 in reference list 1 is identified using the motion vector of a merge candidate in reference list 1. Reference samples of the above template 624 and the left template 626 are obtained (RT1). The RT0 reference samples and the RT1 references are combined and averaged to obtain a single template. A sum of absolute differences (SAD) may be computed between the current template T and the single template formed from the RT0 and RT1 samples. Video encoder 200 and video decoder 300 may use the SAD value to determine if the templates are good match.

Figure 7:
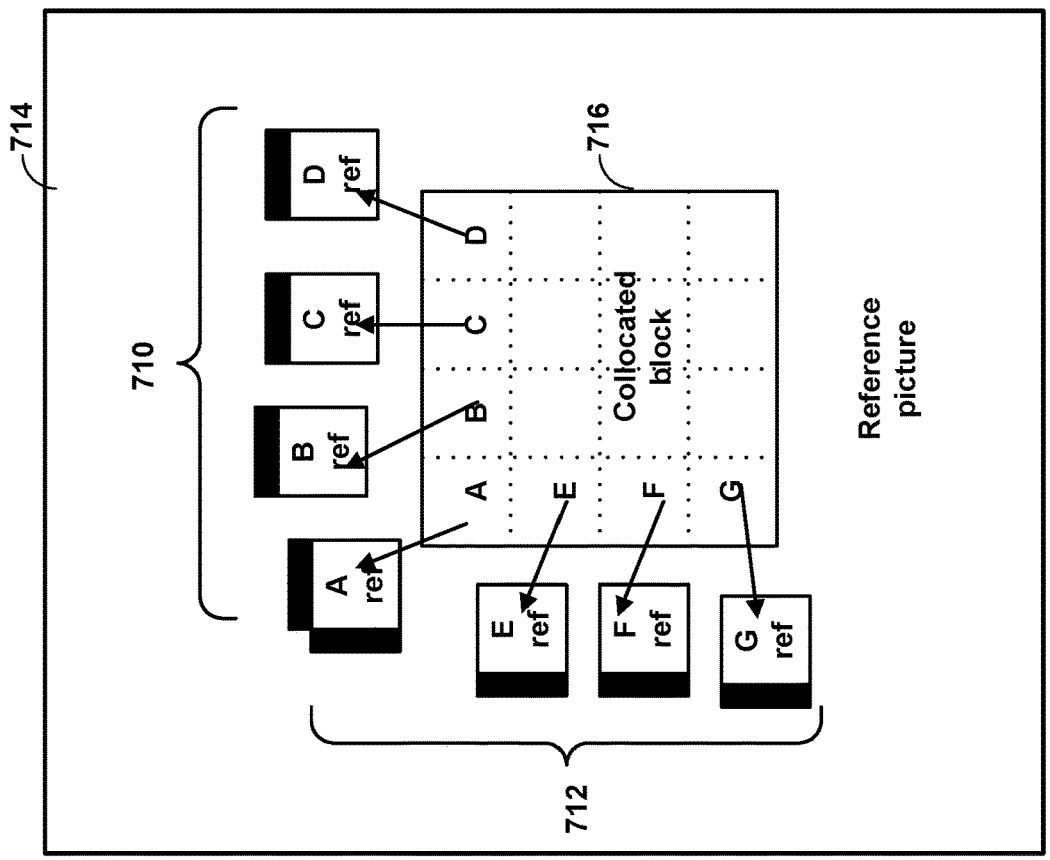
FIG. 7 is a conceptual diagram illustrating example templates and reference samples for sub-block motion.
Figure 7:
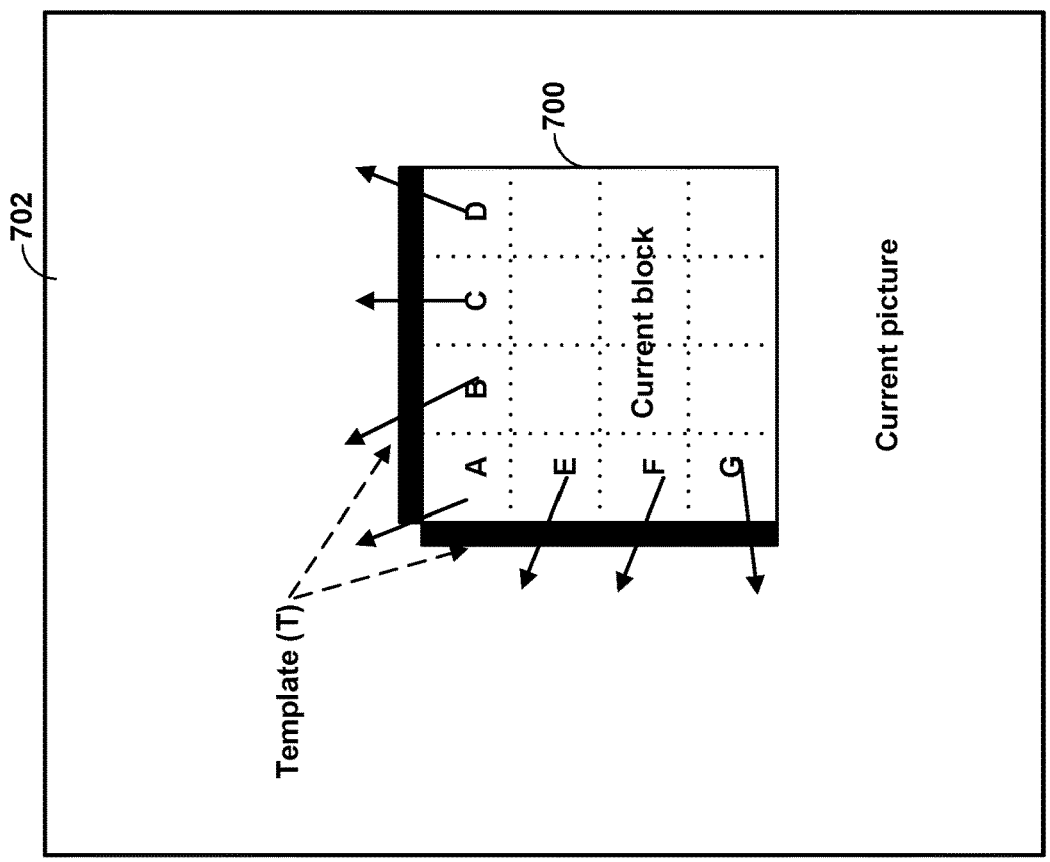

For sub-block-based merge candidates with sub-block size equal to Wsub×Hsub, the above template comprises of several sub-templates with the size of Wsub×1, and the left template comprises several sub-templates with the size of 1×Hsub. FIG. 7 is a conceptual diagram illustrating example templates and reference samples for sub-block motion. As shown in FIG. 7, the motion information of the sub-blocks in the first row (A, B, C, D) and the first column (A, E, F, G) of current block 700 of current picture 702 is used to derive the reference samples of each sub-templates 710 and 712. Sub-templates 710 are represented by the black boxes above the reference blocks A ref, B ref, C ref, and D ref in reference picture 714. The reference blocks of sub-templates 710 are identified by the motion vectors of the sub-bocks A, B, C, D relative to collocated block 716. Sub-templates 712 are represented by the black boxes to the left the reference blocks A ref, E ref, F ref, and G ref in reference picture 714. The reference blocks of sub-templates 712 are identified by the motion vectors of the sub-bocks A, E, F, G relative to collocated block 716.

1.4 Multivariate Linear Regression

Multivariate linear regression, also known as multiple regression, is a statistical technique that can be used to analyze the relationship between a single dependent variable and several independent variables. The objective of a multiple regression analysis is to use the independent variables whose values are known to predict the value of the single dependent value which is unknown. Each predictor value is weighed, with the weights denoting their relative contribution to the overall prediction and are summed to form the prediction. A general model for multivariate linear regression is given by Equation (1):

$$Y = a + b_1 X_1 + b_2 X_2 + \ldots + b_n X_n \quad (1)$$

In Equation (1), Y is the dependent variable, and $X_1, \ldots, X_n$ are the n independent variables. In one example, a least square method may be used to calculate the weights a, $b_1, \ldots, b_n$, where the mean square error between the statistical observation samples and the estimated value is minimized.

In VVC, a block-based affine transform motion compensation prediction is applied to better represent zoom in/out, rotation, perspective motions and the other irregular motions in which motion vector of each sub-block is derived based on a linear model. A motion vector at sample location (x, y) of a sub-block center is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad (2)$$

In Equation (2), taking $mv_x$ as an example, $mv_{0x}$, $mv_{1x}$ and $mv_{2x}$ are the horizontal motion vector components of the top-left, top-right and bottom-left control point motion vectors (CPMVs), respectively, which are known for a given affine model. W and H are the width and height of the current CU, which are also known. In this case, the equation to derive $mv_x$ can be written in the formulae of linear regression. The same technique can be applied to $mv_y$. With this observation, the affine motion model can be equivalently represented by two linear equations in matrix form as:

$$\begin{pmatrix} mv_x \\ mv_y \end{pmatrix} = \begin{pmatrix} b_{x0} & b_{x1} & b_{x2} \\ b_{y0} & b_{y1} & b_{y2} \end{pmatrix}\begin{pmatrix} x \\ y \\ 1 \end{pmatrix} \quad (3)$$

Where $b_{x0} = \dfrac{mv_{1x} - mv_{0x}}{W}$, $b_{x1} = \dfrac{mv_{2x} - mv_{0x}}{H}$ and $b_{x2} = mv_{0x}$;

$b_{y0} = \dfrac{mv_{1y} - mv_{0y}}{W}$, $b_{y1} = \dfrac{mv_{2y} - mv_{0y}}{H}$ and $b_{y2} = mv_{0y}$, respectively.

With the above equation, the derivation process of an affine motion model can be seen as essentially the derivation process of certain coefficients in a linear equation. The estimation of the linear coefficients can be solved by a multivariate linear regression process.

To apply the multivariate linear regression process to affine model derivation, a video coder may obtain the motion vector information and its corresponding sub-block coordinate. The coordinates are the independent variables while the motion vector component is the dependent variable. Given N motion vectors and their corresponding sub-block center coordinates, the affine model parameters can be derived using the following equations:

$$b_{c,d} = \dfrac{\det(B^{c,d})}{\det(A)}, \quad (4)$$

where $\det(B^{c,d})$ and $\det(A)$ are the determinant of matrix $B^{c,d}$ and matrix A, respectively, and $B^{c,d}$ and A are both 3×3 matrices. For a 3×3 matrix, the determinant can be computed by the following equation:

$$\det(M) = (M_{0,0} \times M_{1,1} \times M_{2,2} + M_{1,0} \times M_{2,1} \times M_{0,2} + M_{2,0} \times M_{0,1} \times M_{1,2}) - (M_{0,0} \times M_{2,1} \times M_{1,2} + M_{1,0} \times M_{0,1} \times M_{2,2} + M_{2,0} \times M_{1,1} \times M_{0,2}), \quad (5)$$

where $M_{i,j}$ is the element located at position (i,j) of the matrix and i, j∈{0, 1, 2}.

For the construction of matrices B" and A, the following equations are used:

$$sumMVl_{c,d} = \sum_{k=0}^{N-1}\left(MV_c^k \times l_d^k\right) \quad (6)$$

$$sumll_{i,j} = \sum_{k=0}^{N-1}\left(l_i^k \times l_j^k\right) \quad (7)$$

$$A_{i,j} = sumll_{i,j} \quad (8)$$

$$B_{i,j}^{c,d} = \begin{cases} sumMVl_{c,d}; & j = d \\ sumll_{i,j}; & \text{Otherwise} \end{cases} \quad (9)$$

where:
$$\begin{cases} c \in \{x, y\} \\ d, i, j \in \{0, 1, 2\} \\ k \in \{0, 1, \ldots, N-1\} \\ l_0: \text{center location } x \text{ of } 4 \times 4 \text{ block} \\ l_1: \text{center location } y \text{ of } 4 \times 4 \text{ block} \\ l_2 = 1 \end{cases}$$

With this method, a more optimal affine model can be derived to better describe the input motion vectors considering its corresponding coordinates in a minimum mean square error sense.

To elaborate, an example is given here to illustrate how a video coder may determine an output linear model from the input motion vector field. In this example, the video coder has obtained motion information from certain motion vector fields, and the N motion vectors can be denoted by $\{(mv_{x0}, mv_{y0}), (mv_{x1}, mv_{y1}), (mv_{xN-1}, mv_{yN-1})\}$, and the corresponding center coordinates are denoted as $\{(x_0, y_0), (x_1, y_1), \ldots (x_{N-1}, y_{N-1})\}$.

In a first step, a video coder may determine an anchor coordinate that serves as the origin of the output linear model instead of using (0, 0), which is the top-left coordinate of the whole picture, to avoid large values in computation. This is also being done for the ease of deriving the affine merge candidate after the linear model parameters are derived from the linear regression process. Usually, a video coder may be configured to use the top-left coordinate of the current CU as the origin. Denoting the origin by $(x_{tl}, y_{tl})$, a relative coordinate is computed by subtracting $(x_{tl}, y_{tl})$ from each of the sub-block center coordinate. By doing this, the video coder may obtain $\{(x_0-x_{tl}, y_0-y_{tl}), (x_1-x_{tl}, y_1-y_{tl}), \ldots, (x_{N-1}-x_{tl}, y_{N-1}-y_{tl})\}$. Given the following:

$x_i' = x_i - x_{tl}$ $y_i' = y_i - y_{tl}$, where i∈{0, 1, ..., N−1}, then the video coder obtains $\{(x_0', y_0'), (x_1', y_1'), \ldots, (x_{N-1}', y_{N-1}')\}$.

For motion vectors, a video coder may also select an initial motion vector to be subtracted from to avoid large values in computation, but this is not essential since motion vector values are relatively small compared to the coordinate value. Also, motion vectors can have negative value and subtracting a negative value from a positive value only ends up with an even larger positive value.

The output linear model parameters can be estimated using a mean square error (MSE) minimization method, for the N available neighboring MVs, where the MSE is calculated as the average of the squared difference between the estimated MVs $\{(mv_{x0}', mv_{y0}'), (mv_{x1}', mv_{y1}'), \ldots, (mv_{xN-1}', mv_{yN-1}')\}$, and the actual values of the input MVs $\{(mv_{x0}, mv_{y0}), (mv_{x1}, mv_{y1}), \ldots, (mv_{xN-1}, mv_{yN-1})\}$, for horizontal and vertical components separately, as shown in the following equation:

$$MSE_c = \Sigma_{k=0}^{N-1}(MV_c - MV_c'), \quad (10)$$

where c∈{x, y} denotes the horizontal or vertical component of the motion vectors.

Mathematically, the solution to the MSE minimization is given by Equation (4).

Taking the derivation of parameter $b_{x,0}$ as one example, matrix A is derived by $A_{i,j} = suml'l'_{i,j}$ with i,j∈{0, 1, 2}, where $l'_0$ is the x' of each sub-block, $l'_1$ is the y' of each sub-block and $l'_2=1$ for all sub-blocks. Matrix A element at position (0,0) denoted by $A_{0,0}=\text{suml}l_{0,0}=\Sigma_{k=0}^{N-1}(l'_0{}^k \times l'_0{}^k)=\Sigma_{k=0}^{N-1}(x_k' \times x_k')$. Similarly, the other elements in matrix A can be derived.

For matrix B, when deriving $b_{x,0}$, matrix $B^{x,0}$ may also be derived. From equation (9), all the matrix elements $B_{i,j}^{x,0}$ except for $B_{0,0}^{x,0}$, $B_{1,0}^{x,0}$ and $B_{2,0}^{x,0}$, since j=d=0 here, are equal to element $A_{i,j}$ from matrix A. For elements $B_{i,0}^{x,0}$, taking $B_{0,0}^{x,0}$ as an example, $B_{0,0}^{x,0}=\text{sumMV}l'_{x,0}=\Sigma_{k=0}^{N-1}(MV_x{}^k \times x_k')$. Similarly, $B_{1,0}^{x,0}$ and $B_{2,0}^{x,0}$ can be derived.

With matrix A and $B^{x,0}$, coefficient $$b_{x,0} = \frac{\det(B^{x,0})}{\det(A)},$$

and the determinant of a 3×3 matrix can be computed using equation (5).

Applying a similar procedure to other coefficients, all the linear model parameters $$\begin{pmatrix} b_{x0} & b_{x1} & b_{x2} \\ b_{y0} & b_{y1} & b_{y2} \end{pmatrix}$$

can be solved.

With the estimated parameters, the affine merge candidate for the current CU can be derived using equation (2) with the top-left, top-right and bottom-left CPMVs denoted as $(mv_{tl}, mv_{tl})$, $(mv_{tr}, mv_{tr})$, $(mv_{bl}, mv_{bl})$ equal to:

$(mv_{tl}, mv_{tl}) = (b_{x2}, b_{y2})$ $(mv_{tr}, mv_{tr}) = (b_{x0}W + b_{x2}, b_{y0}W + b_{y2})$ $(mv_{bl}, mv_{bl}) = (b_{x1}H + b_{x2}, b_{y1}H + b_{y2})$, where W and H are the width and height of the current CU. The variables x and y in equation (2) are replaced by the relative distance from the top-left position of the current CU to the position of the corresponding CPMV.

1.5 Non-Adjacent Affine Merge Candidates

Figure 8:
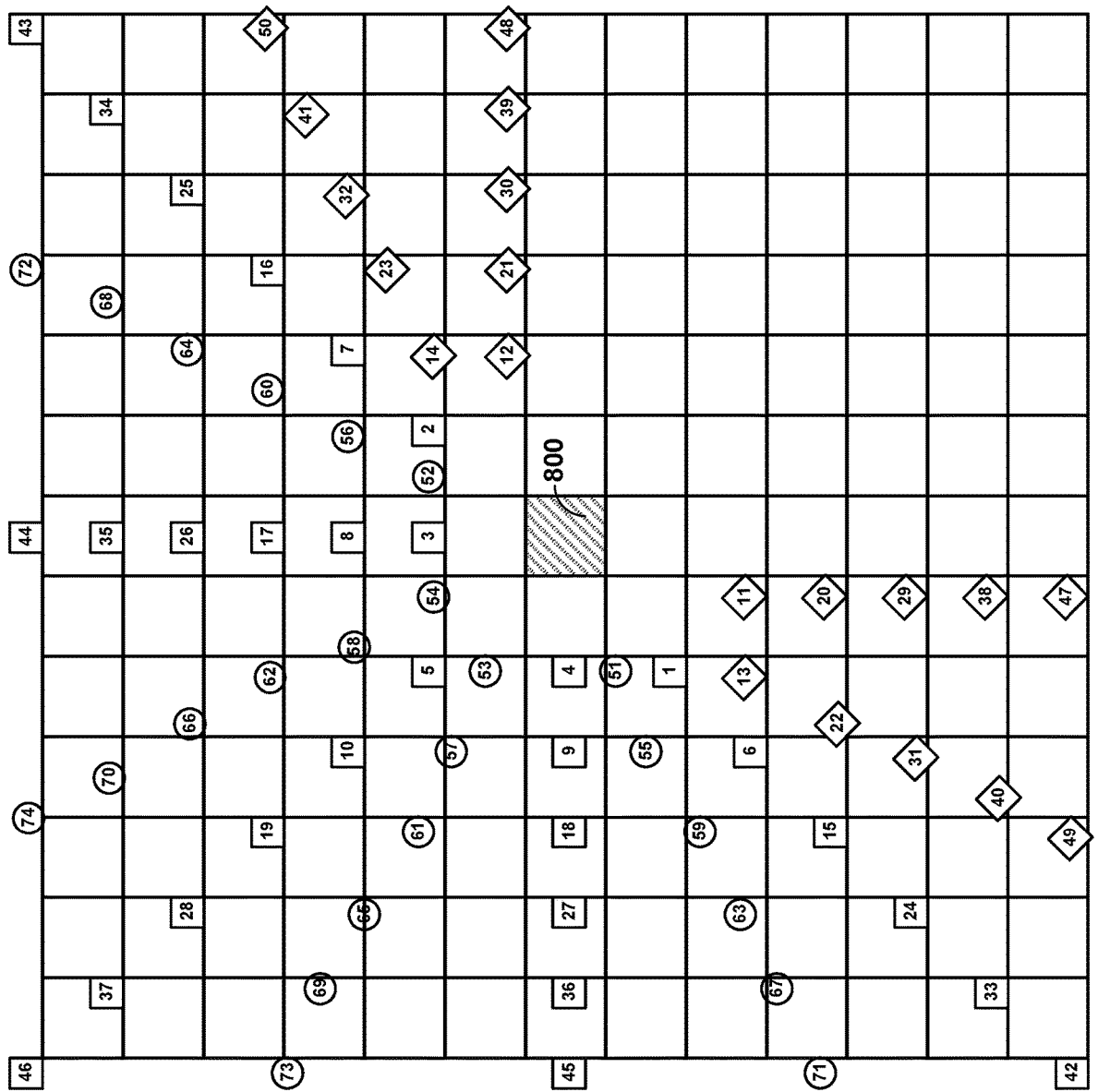
FIG. 8 is a conceptual diagram illustrating example non-adjacent spatial neighboring blocks used to derive non-adjacent affine candidates.

In the regular merge list construction process of one example of ECM, non-adjacent merge candidates are added as a new category of regular merge candidates. A non-adjacent merge candidate scan pattern, as shown in FIG. 8, is used to search for non-adjacent merge candidates. FIG. 8 is a conceptual diagram illustrating example non-adjacent spatial neighboring blocks, relative to current block 800, used to derive non-adjacent affine candidates. The numbers (e.g., indices) in each the symbols showing locations of neighboring blocks may also represent the scan order for determining non-adjacent merge candidates.

Non-adjacent merge candidates have been proven to be useful in improving the regular merge mode performance in some circumstances. Hence, it is intuitive to search for a non-adjacent affine CU and add non-adjacent affine merge candidates to the sub-block merge candidate list to further improve the performance of the sub-block merge mode. Straightforwardly, video encoder 200 and video decoder 300 may be configured to reuse the same non-adjacent merge scan pattern to instead search for non-adjacent affine CUs. The scanning order may follow the index as denoted in FIG. 8 in ascending order. After a non-adjacent affine CU is found, a video coder may directly derive its CPMVs from the non-adjacent position to the current CU position or use its motion vector field to derive the affine model of the current CU through a linear regression process.

Figure 9:
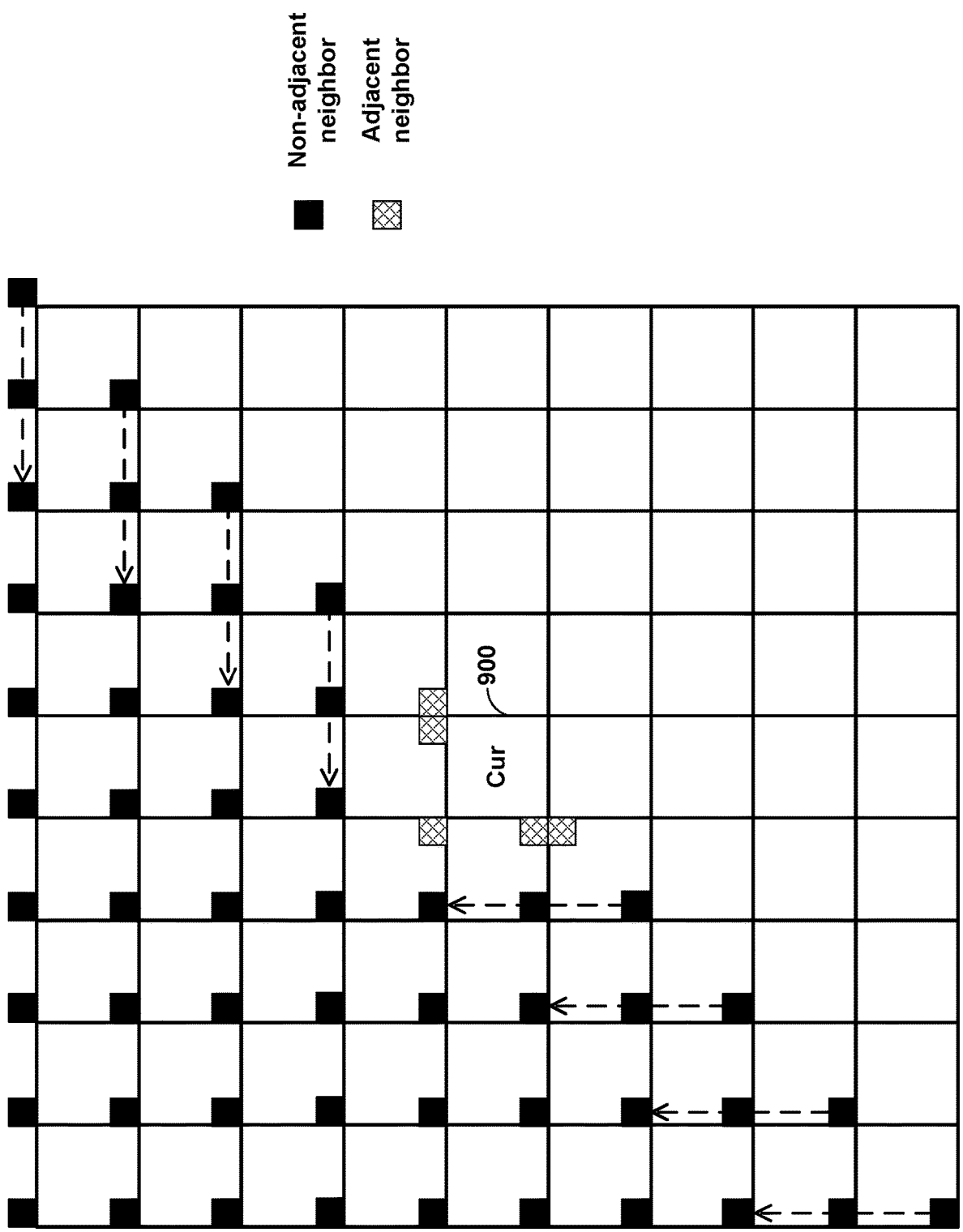
FIG. 9 is a conceptual diagram illustrating another example of non-adjacent spatial neighboring blocks used to derive non-adjacent affine candidates.

In some examples, an extension of non-adjacent merge candidates to non-adjacent affine merge candidates can be used and there can be various design for the scanning pattern. A different scan pattern is shown for current block 900 in FIG. 9. FIG. 9 is a conceptual diagram illustrating another example of non-adjacent spatial neighboring blocks used to derive non-adjacent affine candidates.

The scanning order may follow what is depicted in FIG. 8 or FIG. 9. The non-adjacent spatial neighbor blocks are checked based on their distances to the current block, i.e., from near to far. At a specific distance, a video coder may scan from right to left horizontally and bottom to top vertically.

By using either of the scan patterns mentioned above, a non-adjacent affine CU can be identified, and its corresponding motion vector field can potentially be used as the input to the linear regression process to derive an affine model of the current CU.

1.6 History-Based Affine Merge Candidates

History-based merge candidates were introduced during the VVC standardization process. History-based merge mode includes buffering the motion vectors of previously decoded CUs and using the buffered motion vectors for the motion vector prediction of a current CU. Similar to the extension of non-adjacent merge candidates to non-adjacent affine merge candidates, the concept of the history-based merge candidates can also be extended to history-based affine merge candidates.

Figure 10:
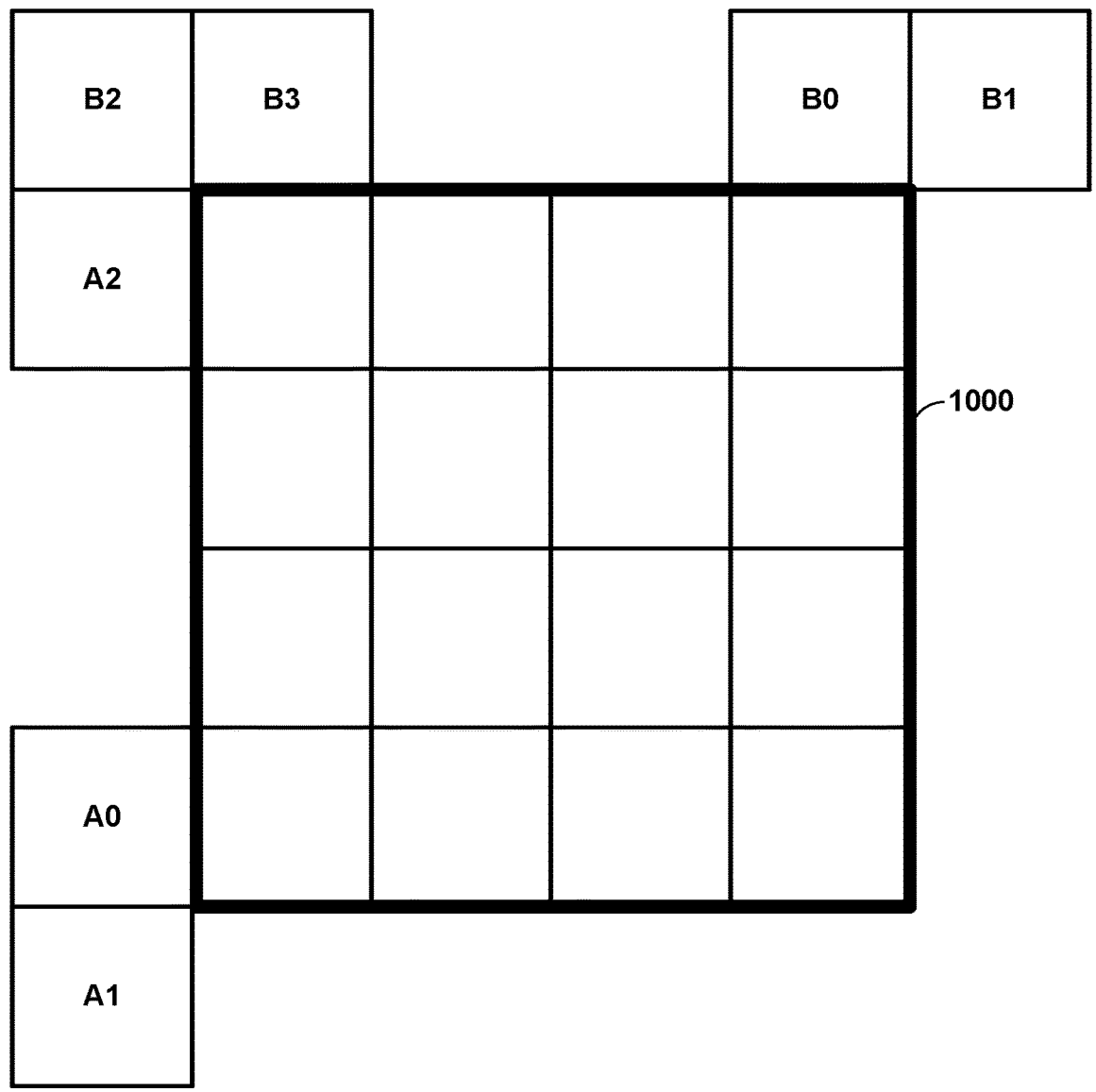
FIG. 10 is a conceptual diagram illustrating example neighboring block positions for constructing affine history merge candidates.

In one example, two different categories of affine history tables are used. In one type of affine history table, only the affine parameters from previously decoded CUs are buffered (e.g., stored for future use). Multiple tables may be created, with each of the tables corresponding to a given reference index and reference list. With this design, for a specific affine history table, all the affine history entries share the same reference picture. When constructing affine merge candidates using the history table, a spatial neighbor block position is first determined, as depicted in FIG. 10. FIG. 10 shows examples spatial neighbor positions A0-A2, and B0-B2 relative to current block 1000. Any one of these spatial neighbor blocks may be the first spatial neighbor block in a scan. In one example, the scan may start with the spatial neighbor blocks in the above-left position (A2, B2, and B3). The scan may then continue to the spatial neighbor blocks in the top-right position (B0 and B1), and then may finish with the spatial neighbor blocks in the bottom-left position (A0 and A1).

The reference list and reference index from the spatial neighbor block is used to determine the affine history table to use. The motion vector serves as the base motion vector. Together with one of the entries in the affine history table, an affine merge candidate or the motion vector field for the current CU can be derived.

In another type of affine history table, not only are the affine parameters buffered, but also the top-left CPMV and the top-left coordinate of the previously decoded CU are buffered. The reference index and reference list are also used and will be inherited by the current CU. The affine merge candidate construction can be done with any of the entry in the affine history table solely without additional information. Video encoder 200 and/or video decoder 300 may use the buffered top-left CPMV, affine parameter, top-left coordinate, and the coordinate of the current CU to derive the affine model for the current CU. Meanwhile, since the top-left coordinate of the previously decoded CU is buffered, video encoder 200 and/or video decoder 300 can also access the motion vector field of the decoded CU directly.

EXAMPLES

This disclosure describes techniques for deriving affine merge candidates. In particular, the techniques of this disclosure include using a multivariate linear regression method to derive more precise affine merge candidates. In a general example, video encoder 200 and video decoder 300 are configured to use a motion vector field from neighboring sub-blocks (e.g., adjacent and/or non-adjacent sub-blocks, which may include previously decoded sub-blocks) as inputs to the multivariate linear regression to derive affine merge candidates. In one example, the motion vector field may include a motion vector and a reference index from each of the sub-blocks from both reference lists. Depending on the category of the input motion vector field, different types of affine merge candidates can be derived.

In a general example, as will be described in more detail below, video encoder 200 and video decoder 300 may be configured to receive a current block of video data to be coded using an affine merge mode. Video encoder 200 and video decoder 300 may determine a refined affine model for the current block of video data from a multivariate linear regression process using a base motion vector field and a guidance motion vector field as inputs to the multivariate linear regression process. In one example, the base motion vector field may be determined from the affine model of neighboring block coded using affine mode. The guidance motion vector field may include motion information from neighboring sub-blocks (e.g., adjacent sub-blocks to the current block). Video encoder 200 and video decoder 300 may the determine one or more affine merge candidates for the current block using the refined affine model, and code the current block of video data using the affine merge candidates. By refining the affine model of a neighbor block using motion information from adjacent sub-blocks, are more accurate affine model for the current block may be determined, thus producing more accurate affine merge candidates for the current block.

2.1 Refine Linear Model with Neighbor Guide

As described in sections 1.1-1.6 above, an affine candidate is essentially a linear model. Each motion vector within the affine CU can be derived from the linear model given the coordinate. However, in one current affine merge list construction process, the inherited affine merge candidate is derived directly from an adjacent affine CU. This design operates according to the assumption that the current CU shares the same linear model as the neighbour CU. However, this is not always true. For example, the neighbor affine CU size might be quite large, and as such, is not particularly spatially close to the current CU. Accordingly, when compared to an accurate linear model for affine motion for the current CU, the linear model from the neighbor CU may can not accurately estimate the motion field of current CU.

In this case, an adjustment of the neighbor affine model might be useful to better approximate the affine motion of the current CU. Motion vectors from the direct spatial neighbors of a current CU are typically more likely to have a relatively strong correlation with the motion of the current CU. Accordingly, video encoder 200 and video decoder 300 may be configured to refine an existing affine model (e.g., from an adjacent or non-adjacent neighbor CU) with the guidance of motion information (e.g., motion vectors, reference indices, and/or reference picture lists) from the direct neighbor area relative to the current CU.

To perform the aforementioned refinement, video encoder 200 and video decoder 300 may be configured to obtain motion vector fields from two different areas. In one example, a first motion vector field is taken from an existing affine model as a base motion vector field. As one example, video encoder 200 and video decoder 300 may use the affine model of an inherited affine merge candidate (I-AffineMVP), such as described above in section 1.2, to determine the base motion vector field. The affine motion vector field of the inherited affine merge candidate may be determined from the CPMVs for the affine merge candidate.

Figure 11:
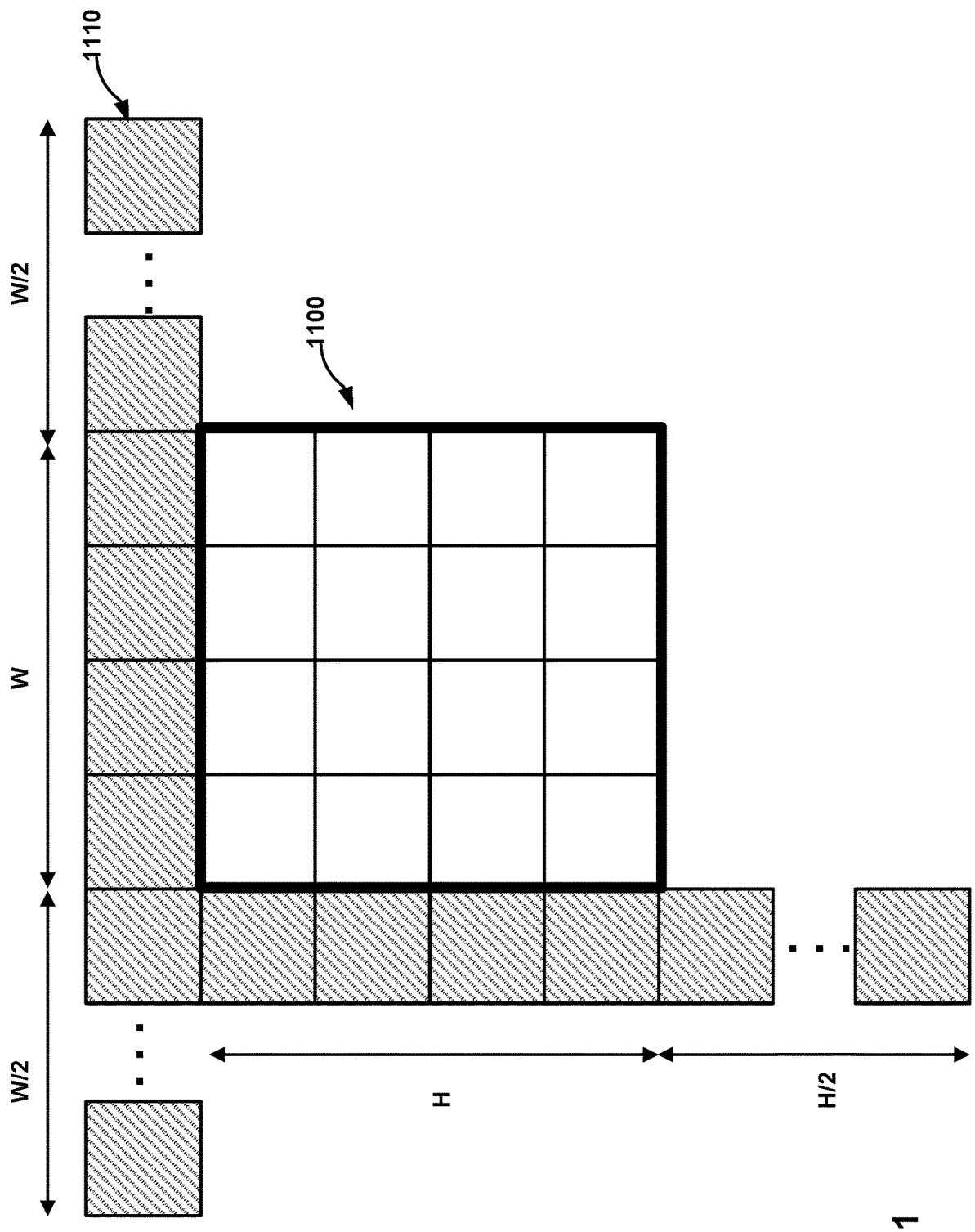
FIG. 11 is a conceptual diagram illustrating an example of direct neighbor sub-block rows and columns for fetching a motion vector field.

A second motion vector field is determined from adjacent sub-blocks that surround the current CU as a guidance motion vector field, as shown in FIG. 11. FIG. 11 is a conceptual diagram illustrating an example of direct neighbor sub-block rows and columns for fetching a motion vector field. Current CU 1100 includes 16 sub-blocks (e.g., in a 4×4 pattern). Sub-blocks 1110 having the hash marks are neighboring sub-blocks of CU 1100. In this example, the neighbor sub-blocks are from the left and above rows of sub-blocks immediately adjacent to CU 1100. However, in some examples, the neighbor sub-blocks that may be used from such rows may extend beyond the width (W) and height (H) of the CU 1100. In this example, the sub-blocks may extend by W/2 or H/2 away from the edges of CU 1100.

In the above example, determining the motion vector field means that video encoder 200 and video decoder 300 are configured to analyze each of the sub-blocks ergodically and are configured to store the motion vectors, reference indices of each reference picture list, as well as the center coordinate of each sub-block together as the output. For example, in FIG. 11, video encoder 200 and video decoder 300 may be configured to check each of the sub-blocks 1110. If a sub-block is coded in inter mode, video encoder 200 and video decoder 300 store the motion vectors and reference indices for both reference lists, as well as the center coordinate of the sub-block.

In one example of ECM, the sub-block size for affine mode is 4×4. However, different inter sub-block modes may use different sub-block sizes. Even for affine mode, a different sub-block size can also be defined. In one example, the base motion vector field is taken from an adjacent spatial neighbor CU that is coded using affine mode, while the guidance motion vector field are taken from the surrounding sub-blocks 1110, as shown in FIG. 11. Following the multivariate linear regression process, a refined affine model is derived and can be used to predict the sub-block motion vector field of current CU. As one example, the output of the linear regression process may be the refined parameters of an affine model (e.g., as shown in equation (3) above). The refined parameters plus an anchor motion vector (e.g., the motion vector of a top-left sub-block) may define the refined affine model to be used for the current block. The refined affine parameters plus the anchor motion vector may be stored as the refined affine merge candidate for the current block. As described above, this refined affine merge candidate may have a more accurate affine model, and thus achieve better compression efficiency, relative to techniques that just use the affine model of a neighbor affine block.

In other examples, rather than storing the refined parameters and the anchor motion vector, video encoder 200 and video decoder 300 may be configured to determine CPMVs (e.g., two or three CPMVs depending on affine mode being used) from the refined parameters and the anchor motion vector and may then store the determined CPMVs as the affine merge candidate. As discussed above, CPMVs may also be used to determine the affine model of the block.

Video encoder 200 may signal an index into the merge candidate list and video decoder 300 may retrieve the motion information (e.g., refined parameters and anchor motion vector, or CPMVs) associated with the merge candidate and then may generate the sub-block motion vector field used for decoding the sub-blocks.

To reiterate, in a general example, video encoder 200 and video decoder 300 may be configured to receive a current block of video data to be coded using an affine merge mode. Video encoder 200 and video decoder 300 may determine a parameters and/or CPMVs for a refined affine model for the current block of video data using a base motion vector field and a guidance motion vector field as inputs to a multivariate linear regression process. Video encoder 200 and video decoder 300 may determine the base motion vector field from an affine model associated with a neighboring block. Video encoder 200 and video decoder 300 may determine the guidance motion vector field from motion information associated with a plurality of sub-blocks adjacent to the current block. The plurality of sub-blocks adjacent to the current block may include a first plurality of sub-blocks in a row adjacent to the current block and/or a second plurality of sub-blocks in a column adjacent to the current block. Video encoder 200 and video decoder 300 may the determine one or more affine merge candidates for the current block using the refined affine model, and code the current block of video data using the affine merge candidates. By refining the affine model of a neighbor block using motion information from adjacent sub-blocks, are more accurate affine model for the current block may be determined, thus producing more accurate affine merge candidates for the current block.

The following is one example of a multivariate linear regression process for a 3×3 model. The input information to the regression process is the sub-block motion vectors and their corresponding center coordinates. It does not matter if the sub-block are from the base motion vector field or guidance motion vector field. The minimum number of sub-blocks used to derive the model parameters is three. The three sub-blocks have the following motion vectors (MVs): $(mv_{x0}, mv_{y0})$, $(mv_{x1}, mv_{y1})$ and $(mv_{x2}, mv_{y2})$. The corresponding center coordinates are $(x_0, y_0)$, $(x_1, y_1)$ and $(x_2, y_2)$. The refined motion vector field (RMVF) parameters are derived using equation $$b_{c,d} = \frac{\det(B^{c,d})}{\det(A)},$$

where det( ) is the determinant of a matrix. Matrix A and $B^{c,d}$ are all 3×3 matrices.

For a 3×3 matrix, its determinant is computed by the formulae: $\det(M) = (M_{0,0} \times M_{1,1} \times M_{2,2} \ M_{1,0} \times M_{2,1} \times M_{0,2} \ M_{2,0} \times M_{0,1} \times M_{1,2}) - (M_{0,0} \times M_{2,1} \times M_{1,2} \ M_{1,0} \times M_{0,1} \times M_{2,2} \ M_{2,0} \times M_{1,1} \times M_{0,2})$, where $M_{i,j}$ is the element located at position (i,j) of the matrix and i, j∈{0, 1, 2}

$$\text{Matrix } A = \begin{pmatrix} \sum x^2 & \sum xy & \sum x \\ \sum xy & \sum y^2 & \sum y \\ \sum x & \sum y & \sum 1 \end{pmatrix} = \begin{pmatrix} x_0^2 + x_1^2 + x_2^2 & x_0 y_0 + x_1 y_1 + x_2 y_2 & x_0 + x_1 + x_2 \\ x_0 y_0 + x_1 y_1 + x_2 y_2 & y_0^2 + y_1^2 + y_2^2 & y_0 + y_1 + y_2 \\ x_0 + x_1 + x_2 & y_0 + y_1 + y_2 & 3 \end{pmatrix}$$

Matrix $B^{c,d}$ is derived based on matrix A by replacing column d with vector $$\begin{pmatrix} \sum x m v_c \\ \sum y m v_c \\ \sum m v_c \end{pmatrix}$$

where c∈{x, y} indicates if the matrix is related to the horizontal or vertical motion vector components and d ∈ {0, 1, 2} indicates which model parameter solved for since the linear model is $$\begin{pmatrix} mv_x \\ mv_y \end{pmatrix} = \begin{pmatrix} b_{x0} & b_{x1} & b_{x2} \\ b_{y0} & b_{y1} & b_{y2} \end{pmatrix} \begin{pmatrix} x \\ y \\ 1 \end{pmatrix}.$$

Taking the derivation of parameter $b_{x0}$ as an example, a vector $$\begin{pmatrix} \sum x m v_c \\ \sum y m v_c \\ \sum m v_c \end{pmatrix} = \begin{pmatrix} x_0 m v_{x0} + x_1 m v_{x1} + x_2 m v_{x2} \\ y_0 m v_{x0} + y_1 m v_{x1} + y_2 m v_{x2} \\ m v_{x0} + m v_{x1} + m v_{x2} \end{pmatrix}.$$

Replacing the first column in matrix A with the above vector, matrix $B^{x,0}$ is given as following:

$$B^{x,0} = \begin{pmatrix} x_0 m v_{x0} + x_1 m v_{x1} + x_2 m v_{x2} & x_0 y_0 + x_1 y_1 + x_2 y_2 & x_0 + x_1 + x_2 \\ y_0 m v_{x0} + y_1 m v_{x1} + y_2 m v_{x2} & y_0^2 + y_1^2 + y_2^2 & y_0 + y_1 + y_2 \\ m v_{x0} + m v_{x1} + m v_{x2} & y_0 + y_1 + y_2 & 3 \end{pmatrix}.$$

With both matrices A and $B^{x,0}$ derived, the determinant of both 3×3 matrices can be computed and using equation $$b_{x,0} = \frac{\det(B^{x,0})}{\det(A)},$$

parameter $b_{x,0}$ can be derived.

Similarly, other parameters $b_{x,1}$, $b_{x,2}$, $b_{y,0}$, $b_{y,1}$, $b_{y,2}$ can also be derived.

Usually, an anchor coordinate may be determined so that the delta coordinates are used instead of the original sub-block center coordinates. The anchor coordinates are commonly defined as the top-left coordinate of the current CU denoted as $(x_{tl}, y_{tl})$.

With the anchor coordinate, in the derivation process as described above, for example $x_0$ is replaced by $x_0 - x_{tl}$. The same thing applies to all the coordinates $x_0$, $x_1$, $x_2$, $y_0$, $y_1$ and $y_2$.

Since a CPMV is the most common way in representing an affine model, the final outputs are affine CPMVs computed based on the derived regression model parameters and the width and height of the current CU W and H:

Top-left CPMV: $(mv_{tl}, mv_{tl}) = (b_{x2}, b_{y2})$
Top-right CPMV: $(mv_{tr}, mv_{tr}) = (b_{x0}W + b_{x2}, b_{y0}W + b_{y2})$
Bottom-left CPMV: $(mv_{bl}, mv_{bl}) = (b_{x1}H + b_{x2}, b_{y1}H + b_{y2})$.

In regular merge mode, a merge candidate derived from a non-adjacent spatial neighbor area has been shown to be effective in predicting the current CU motion vector. In affine merge mode, this observation can also hold true. An affine CU located in the non-adjacent spatial neighbor area can help to increase the variety of affine models that can be used to derive the affine model of the current CU. However, since a non-adjacent affine CU is relatively far away from the current CU spatially, directly using the affine model of the non-adjacent affine CU to derive the affine model for the current CU position may end up with a less precise motion vector prediction result.

To alleviate this potential issue, in a second example, video encoder 200 and video decoder 300 are configured to use the affine model from a non-adjacent affine CU as the base motion vector field, while the guidance motion vector field of the above example remains the same as described above. That is, the guidance motion vector field is taken from the adjacent sub-block row and column that surrounds the current CU. Taking these two motion vector fields as input to the multivariate linear regression process, video encoder 200 and video decoder 300 can generate more varieties of affine models while refining the non-adjacent affine model to be more accurate for the current CU. In this way, a base motion vector field may still be obtained from another affine coded block in the same picture of the CU, including blocks that are farther away in distance from the current CU. Such an affine model may then be refined by the motion information from the guidance motion vector field taken from sub-block locations adjacent to the current block, thus obtaining a more accurate affine model for the current block, and thus more accurate affine merge candidates. The more affine merge candidates may result in greater compression efficiency, improved distortion, or both.

In some examples, motion vectors from a sub-set of the neighboring sub-blocks may be used as the guidance motion vector field. In one example, only motion vectors from a sub-block column (e.g., sub-blocks to the left of the current CU) are used as the guidance motion vector field. In a second example, only motion vectors from a sub-block row (e.g., sub-blocks above the current CU) are used. In a third example, the guidance motion vector field area is determined based on the position of the base motion vector field. If the base motion vector field is determined from a neighbor CU located above the current CU, then the motion vectors from the sub-block row will be used as the guidance motion vector field. If the base motion vector field is determined from a neighbor CU located to the left of the current CU, then the motion vectors from the sub-block column will be used as the guidance motion vector field. By using only a sub-set of the potential motion information from adjacent sub-blocks as the guidance motion vector field, the motion information used to refine the affine model may be taken from a spatial location of the picture that is more likely to reflect the motion present in the current block, thus improving coding efficiency.

In another example of the disclosure, the base motion vector field may be divided with even finer granularity. Instead of only dividing the plurality of adjacent sub-blocks (e.g., see sub-blocks in FIG. 11) into above and left regions, video encoder 200 and video decoder 300 may be configured to divide the plurality of sub-blocks that may be used to determine the potential base motion vector field into above-left, above, above-right, left, and bottom-left areas with respect to the current CU. Again, video encoder 200 and video decoder 300 may be configured to determine the guidance motion vector field based on the position of the neighbor CU used to determine base motion vector field.

For example, if the neighbor CU used to derive the base motion vector field is located in the above-left area, then only the above-left part of the sub-block row with width of W/2 is used as the guidance motion vector field. A similar rule is applied to other divided areas. The width of W (e.g., the current CU width) of the sub-block row is used if base motion vector field is from above area; the width of the above-right W/2 sub-block row is used if base motion vector field is from above-right area; the height of H (e.g., the current CU height) of the sub-block column is used if the base motion vector field is from left area; and the height of H/2 bottom-left sub-block column is used if the base motion vector field is from bottom-left area. In some examples, the width of the sub-block row and height of sub-block column is not limited to the current CU width W and current CU height H. A different size may also be used.

In another example, representative motion vectors of the base motion vector field are used instead of all the MVs. In one example, the motion vectors from the corner sub-blocks of the neighboring affine CU or non-adjacent affine CU are used. In another example, the motion vectors at the corner sub-blocks and the motion vector at the center of the referenced CU are used.

The refinement of the linear model is not limited to affine mode only. Other inter modes using motion vector fields that can be described or approximated by a linear model from either adjacent or non-adjacent neighbor areas can also be refined using the techniques described above.

As described above, the affine model of a non-adjacent CU coded using affine mode may be used to determine the base motion vector field. In other examples, the affine model associated with a non-adjacent neighboring block that is stored in a history table may be used to determine the base motion vector field. To use a history-based affine CU as the base linear model to be refined, an alternative history table design may be used. In one example, instead of storing the affine parameters, the affine CU position and size are stored. With the size and position information, associated motion vectors and/or CPMVs may be obtained, and the affine motion field can be directly accessed and used as the base motion vector field.

Sometimes, motion vector fields may not be available. Due to memory usage considerations, certain memory constraints may be applied. Motion information beyond certain coordinates away from the currently coded block, CU, CTU, and/or slice may not be stored. In some examples, the top-left coordinate of the current CTU is used as the anchor point and is defined as (CurCtuX, CurCtuY). A certain threshold (e.g., a distance constraint) is used to define for how large an area the motion information will be stored. Define the threshold for the distance constraint, for x and y coordinates, as thredX and thredY. Given this threshold, a coordinate (CurCtuX−thredX, CurCtuY−thredY) can be derived. Video encoder 200 and video decoder 300 may be configured to store motion information only for positions (CurX, CurY), where both CurX≥CurCtuX−thredX and CurY≥CurCtuY−thredY.

To address motion vector field unavailability issues caused by a distance constraint (e.g., also called a memory constraint) for a history-based affine CU, in a second example, the top-left coordinates of the decoded affine CU, the top-left CPMV (e.g., the anchor motion vector), and its corresponding affine parameters are stored. With this information, video encoder 200 and video decoder 300 can derive a pseudo affine motion vector field (e.g., an estimated motion vector field) with a size, e.g., equal to the current CU size, and then use the derived motion vector field as the base linear model to be refined.

In a third example, only the top-left position of the decoded affine CU is stored. Motion vectors from the top-left sub-block, the sub-block next to the top-left sub-block on the right, and the sub-block next to the top-left subblock below (these sub-block MVs can be either directly accessed or stored in the affine history table depending on availability) can be used to derive the affine parameters. With the affine parameters, the top-left coordinate, and the top-left sub-block motion vector, video encoder 200 and video decoder 300 may derive the affine motion vector field and use this affine motion vector field as the base linear model motion vector field to be refined.

When the base linear model is to be determined from the affine model of a non-adjacent affine CU, video encoder 200 and video decoder 300 may first check a non-adjacent coordinate of the non-adjacent CU (e.g., the top-left corner of the CU) to determine if the non-adjacent affine CU is available. If the non-adjacent position is located outside of the memory threshold line (e.g., outside the distance constraint), no motion information will be stored for that non-adjacent CU. As such, it is unknown if the non-adjacent CU at that position is an affine CU or not. To address such issue, the non-adjacent position of that CU may be converted to a coordinate that is located within the memory threshold line (e.g., inside the distance constraint).

In one example, when CurX<CurCtuX−thredX, CurX may be converted to CurCtuX−1. With the converted position, motion information will be available to determine if the CU there is an affine CU or not. In case an affine CU is found in the converted position, if the found affine CU is located entirely within the memory threshold line, then the whole affine motion vector field will be used as the base linear model to be refined. When the found affine CU is only partially located within the memory threshold line, only those sub-blocks that are located within the memory threshold line will be used as the base linear model.

Accordingly, in a further example of the disclosure, video encoder 200 and video decoder may be configured to determine that a neighboring block is at a position that is outside of a distance constraint of the history table. Video encoder 200 and video decoder may convert a coordinate of the neighboring block to be an adjusted coordinate located within the distance constraint of the history table, and then determine the affine model from a second affine model associated with a second block located at the adjusted coordinate. In some examples, video encoder 200 and video decoder 300 may determine the affine model associated with the second block. In other examples, video encoder 200 and video decoder 300 may determine the base motion vector field from a subset of sub-blocks of the second block based on the second block not being fully within the distance constraint of the history table.

For the guidance motion vector field, each of the sub-block positions may be examined, and only those sub-blocks that are located within a memory threshold line (e.g., a distance constraint) will be used.

In an example non-adjacent regular merge candidate construction process, the same memory constraint may be applied. Hence, the solution used to address issues caused by memory constraints in constructing non-adjacent regular merge candidate list can also be applied to both the base linear model motion field and guidance motion vector field.

In some examples, the affine history table contains affine CU information that has been recently decoded (or reconstructed at the encoder side). However, due to the existence of spatial inherited affine merge candidates, some of the history-based affine CU candidates may be unavoidably identical to the spatial inherited affine candidates. Also, when a CTU has just started to be decoded/reconstructed, there may be very few available affine CUs from the spatial neighbourhood. To address this issue, in one example, an affine history table that only contains a few affine CUs, video encoder 200 and video decoder 300 may construct information from a neighbouring CTU, e.g. left CTU, and may sue the constructed information as the source of base linear model to be refined. That is, affine information from neighboring CTUs is kept instead of being emptied from the history table. In some other examples, the affine history table may contain affine CU information from the above or above-left CTU.

Some of the sub-block motion vectors from both the base linear model motion vector field and the guidance motion vector field may be pointing to a position that is located outside of the boundary of the reference picture, especially when the current CU is located close to the picture boundary. This could happen due to direct motion information merging or some coding tools that modify the motion vectors. Such a motion vector is considered as an Out-Of-Boundary (OOB) motion vector and are generally less reliable that motion vectors that are not OOB. Hence, in one example, video encoder 200 and video decoder 300 are configured to exclude OOB MVs from the regression based affine candidate derivation process. In one example, OOB motion vectors from the base linear model are excluded from the input to the linear regression process. In a second example, the OOB motion vectors from the guidance motion vector field are excluded from the input to the linear regression process. In a third example, OOB motion vectors from both motion vector fields are not used.

The definition of an OOB motion vector may vary. A pre-defined threshold may be used to determine if a motion vector is an OOB motion vector. In one example, if the motion vector is pointing to a position that is beyond ½-pel distance outside the reference picture boundary, this motion vector is OOB. In some other examples, a different threshold may be used to determine if a motion vector is OOB.

Some motion vectors may also be considered as outliers and abandoned for the regression process even if the motion vector is not a OOB motion vector. For example, one sub-block motion vector can be very different from another trusted motion vector in terms of its absolute difference between its horizontal component and the trusted motion vectors horizontal component or its absolute difference between its vertical component and the trusted motion vectors vertical component. In one example, the affine information from the base linear model motion vector field is used to derive a set of sub-block motion vectors that share the same sub-block positions of each of the sub-blocks from the guidance motion vector field. Then for each of the sub-block, the absolute difference of the horizontal, vertical or both components are computed between the sub-block MV from the guidance motion vector field and the corresponding derived sub-block MV using the affine information. Considering the sub-block motion vectors from the base linear motion vector field are more reliable (e.g., are the trusted motion vectors), if the difference is larger than a pre-defined threshold, the sub-block motion vector from the guidance motion vector field is excluded from the input to the linear regression process. In a second example, the sub-block motion vectors from the guidance motion vector field are considered to be more reliable and the sub-block motion vector from the base linear model motion field are not used if they are outside of a threshold difference from the motion vectors of the guidance motion vector field.

2.2 Derive Linear Model from Temporal Motion Vector Predictor (TMVP)

The linear regression method can also be used to derive a linear model (affine motion model, for example) from temporal motion vector predictors. In one example, the SbTMVP motion vector field is used as input for the linear regression. In another example, the SbTMVP motion vector field and the guidance motion vector field are both used as input for the linear regression.

2.3 Refine Linear Model with Another Linear Model

In section 2.1, it is mentioned that an existing linear model can be refined using a sub-block motion vector field from spatial neighbours as guidance. However, spatial neighbour sub-block motion vectors are not the only choice. In some cases, the current CU can be described by a linear model that is in-between two other linear models. Such a model can be derived by inputting the motion vector field from two different linear models to the regression process.

In one example, the motion vector fields from two different adjacent affine spatial neighbour CUs are used to derive a new linear model through a linear regression process. In a second example, the motion vector fields from two different non-adjacent affine spatial neighbour CUs are used instead. In a third example, one of the two affine motion vector fields may come from an adjacent affine spatial neighbour CU, while the other motion vector field may be fetched from a non-adjacent affine spatial neighbour CU.

In another example, representative sub-block motion vectors, instead of all sub-block motion vectors from the two reference affine CUs, are used. In one example, the motion vectors at the corner sub-blocks are used. In another example, the motion vectors at the corner sub-blocks and the motion vector at the center of the block are used.

Other inter mode with motion vector fields that can be described or approximated by a linear model from either an adjacent or non-adjacent neighbor area can also be used in the same way to serve as inputs to the regression process to derive a new linear model from two different linear models.

2.4 Derive Linear Model from Two Motion Vector Fields

Linear regression can estimate an improved linear model to better describe the input data samples in a least square error sense. Hence, the inputs to the linear regression do not necessarily have to be originated from a linear model. The inputs can come from a random area with a random motion vector field. However, to ensure that the output linear model has a relatively strong correlation with the current CU, it may be more optimal to at least have one of the motion vector fields come from the direct spatial neighbour area of the current CU, since motion vectors from the direct spatial neighbors of the current CU are more likely to have a stronger correlation with the motion vector of the current CU. In one example, video encoder 200 and video decoder 300 may be configured to use a motion vector field from the direct sub-block neighbor row and/or column to ensure correlation, and may use a second motion vector field from a non-adjacent sub-block row and/or column to enrich candidate varieties. An illustration is shown in FIG. 12.

Figure 12:
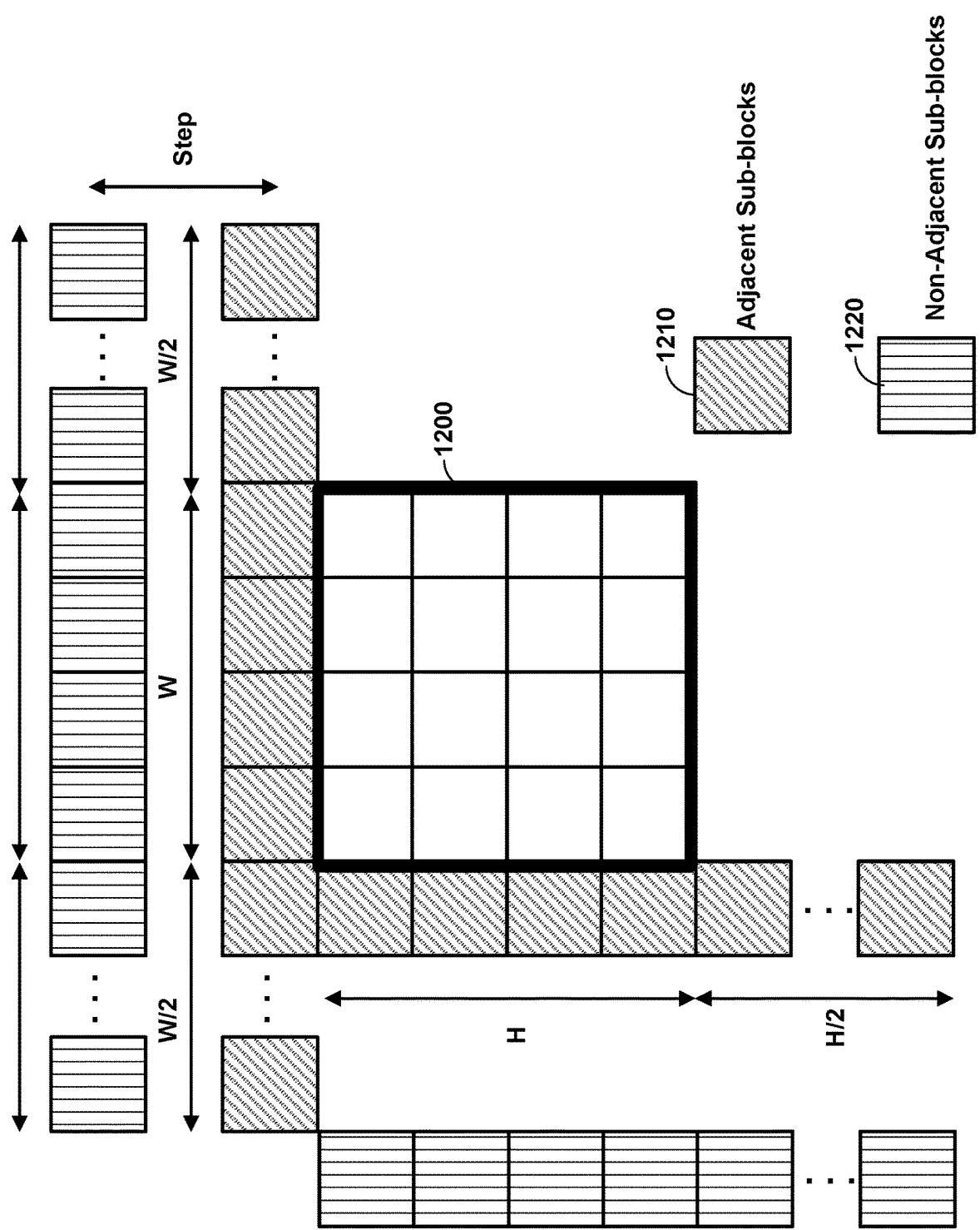
FIG. 12 is a conceptual diagram illustrating an example of deriving a linear model from non-adjacent motion vector fields with an adjacent motion vector field.

FIG. 12 is a conceptual diagram illustrating an example of deriving a linear model from non-adjacent motion vector fields with an adjacent motion vector field. As shown in FIG. 12, adjacent sub-blocks 1210 are in a column or row that is directly adjacent to current CU 1200. Non-adjacent sub-blocks 1220 are in columns and/or rows that are not directly adjacent to current CU 1200.

2.5 Derive Linear Model with Multiple Motion Vector Fields

The number of motion vector fields input to the linear regression process is not limited to two but may be extended to three or more motion vector fields. Also, each of the motion vector fields are not limited to be from a linear model but may also be taken from a random area. This extension can be applied to any of the examples mentioned in sections 2.1, 2.3, and 2.4.

In one example, multiple motion vector fields from different adjacent affine CUs can be used as an input to the linear regression process to derive a new linear model. In a second example, multiple motion vector fields from different non-adjacent affine CUs can be used. In another example, multiple motion vector fields from both adjacent and non-adjacent affine CUs are used. In a fourth example, multiple motion vector fields from different affine CUs plus one motion vector field from an adjacent spatial neighbour sub-block row and/or column are used to generate a new linear model. In another example, multiple motion vector fields from multiple adjacent and non-adjacent sub-block rows and/or columns are used.

2.6 Sub-Sampling of Sub-Block Motion Vectors

The output linear regression model from the linear regression process is influenced by the number of sub-block motion vectors from each of the motion vector fields. In one example, the input includes two motion vector fields, where one motion vector field comes from a non-adjacent affine CU (e.g., the base motion vector field) and another motion vector field comes from an adjacent spatial neighbour sub-block row and/or column (e.g., the guidance motion vector field). Depending on the size of current CU and the size of the non-adjacent affine CU, the number of sub-blocks from the two motion vector fields might be different. To better ensure a more optimal balance between the number of sub-blocks from adjacent spatial neighbour sub-block rows and columns and a non-adjacent affine CU, it may be beneficial to sub-sample one of the motion vector fields. In one example, the motion vector fields from the adjacent spatial neighbour sub-block row and column are sub-sampled every other sub-blocks. In another example, the motion vector fields from the non-adjacent affine CU are sub-sampled where only the first sub-block row and sub-block column are used. The sub-sampling of motion vectors can be applied to any of the motion vector fields in any manner depending on if the linear regression process is prone to be biased towards one of the motion vector fields or to be balanced between input motion vector fields.

2.7 Sub-Block Motion Vector Scaling

In some examples, the motion vectors from different motion vector fields, or even within a single motion vector field, may not share the same reference picture. Generally, it is reasonable to ensure that motion vectors input to the linear regression process share the same reference picture. In this case, motion vector scaling maybe applied. In one example, video encoder 200 and video decoder 300 may determine a reference index that is most frequently used among the motion vectors fields. Video encoder 200 and video decoder 300 may scale the motion vectors with a different reference index to the most frequently used reference index. In a second example, only the motion vectors with a reference index that is statistically most frequently are used are input to the linear regression process. In a third example, the reference picture to use is determined based on one of the input motion vector fields, e.g., the base motion field described in section 2.1. In another example, the motion vectors are scaled to the reference picture that is statistically less frequently used.

Motion vectors from reference list 0 and reference list 1 may point to the same reference picture even though their reference indices are not the same. In yet another example, after a given reference index is determined for a given reference list, the Picture Order Count (POC) can be derived. Then, the POC of a sub-block MV from the other reference list can also be determined by its reference list index and reference picture index. If a sub-block MV from the other reference list has the same POC as the POC of the given reference list, this MV from the other reference list can also be used as the input to the linear regression process for deriving linear model of the given reference list.

2.8 Conversion from Uni-Directional Prediction to Bi-Directional Prediction

In some examples, affine mode is a sub-block-based motion model. This feature would usually lead to blocking artifacts not only around the CU boundary, but also between neighbouring sub-blocks. For bi-directional prediction, the blending process of the two predictors may blur the block edges and hence alleviate the blocking artifacts. Because of this, it might be preferable to convert the affine uni-directional prediction candidate to a bi-directional prediction candidate during the regression based affine candidate derivation process.

If the base linear model motion field is uni-directionally predicted while the guidance motion vector field is bi-directionally predicted, the regression-based candidate may still be derived to be bi-directionally predicted. In one example, the prediction direction where the motion information is only available from the guidance motion vector field may be derived solely based on the guidance motion vector field motion information for this given prediction direction. In a second example, the base linear model motion vector field motion vectors may be scaled to the other reference list with a reference picture decided by the guidance motion vector field.

The above techniques may also be applied in the reciprocal fashion. If the base linear model motion field is bi-directionally predicted while the guidance motion vector field is uni-directionally predicted, the regression-based candidate may still be derived to be bi-directionally predicted. In one example, the prediction direction where the motion information is only available from the linear model motion vector field may be derived solely based on the base linear model motion vector field motion information for this given prediction direction. In a second example, the guidance motion vector field motion vectors may be scaled to the other reference list with a reference picture decided by the base linear model motion vector field.

If both the base linear model motion field and the guidance motion vector field are uni-directionally predicted, and they include motion vectors pointing to different reference lists, motion vector scaling can be applied to either scale the motion vectors from the guidance motion vector field to the direction of the base linear model motion field or the other way around, depending on which prediction direction is being derived. If both the base linear model motion field and the guidance motion vector field are un-predicted, and have the same reference list, a reference index from the unavailable prediction direction may be designated and motion vectors from both motion vector fields may be scaled to the missing direction.

In another example, when selecting the base linear model motion vector field, it may be beneficial to ensure that it is bi-directional predicted. In this case, if a base linear model motion vector field is uni-directionally predicted, video encoder 200 and video decoder 300 may be configured to not use it to derive regression-based candidate.

Figure 13:
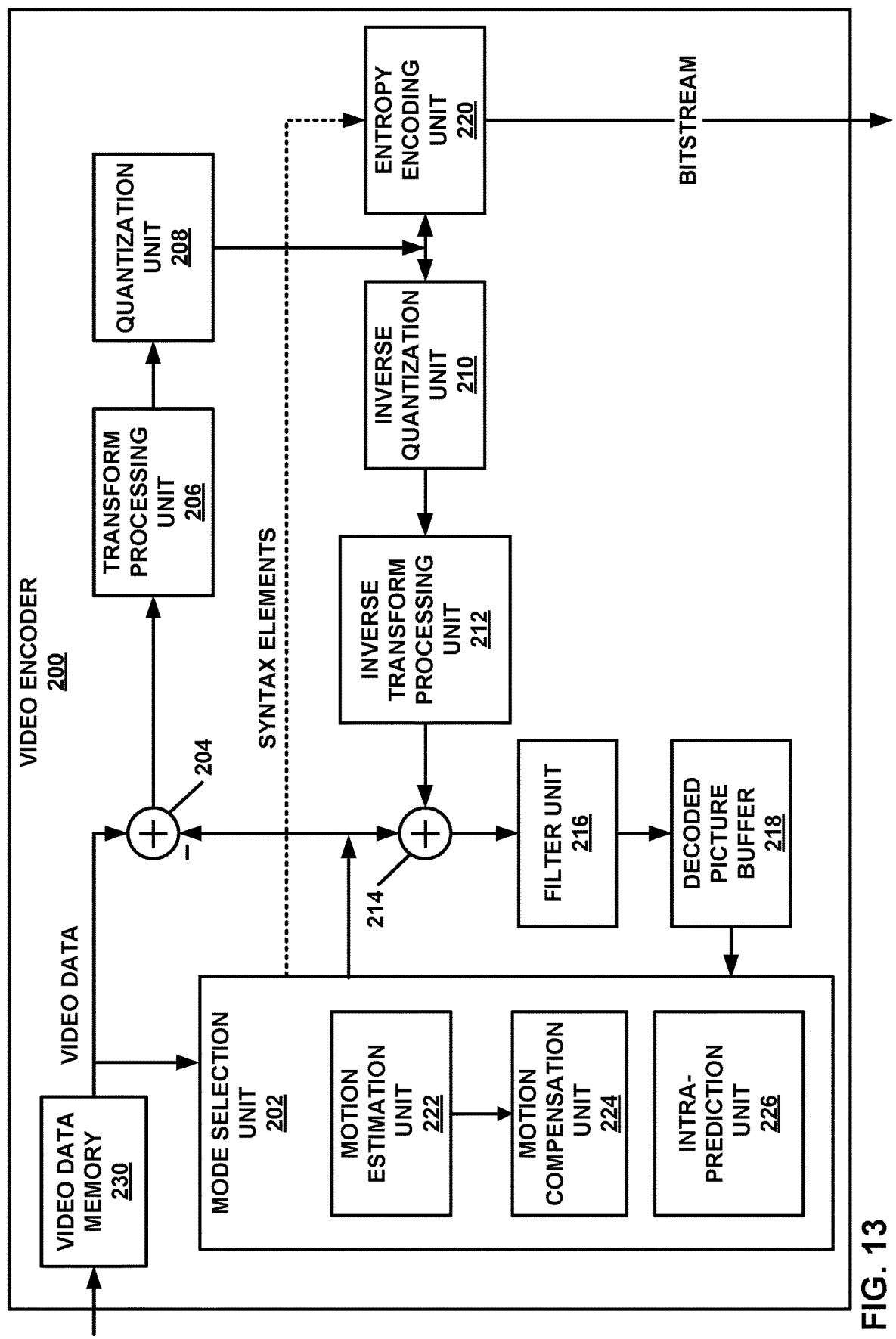
FIG. 13 is a block diagram illustrating an example video encoder that may perform the techniques of this disclosure.

FIG. 13 is a block diagram illustrating an example video encoder 200 that may perform the techniques of this disclosure. FIG. 13 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 13, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 13 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Motion estimation unit 222 and/or motion compensation unit 224 may be configured to perform any of the techniques described above for determining affine merge candidates and refining and affine motion model using a base motion vector field and a guidance motion vector field as inputs to a linear regression process.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to receive a current block of video data to be encoded using an affine merge mode, determine a refined affine model for the current block of video data using a base motion vector field and a guidance motion vector field as inputs to the multivariate linear regression process. determine affine merge candidates for the current block using the refined affine model, and encode the current block of video data using the affine merge candidates.

Figure 14:
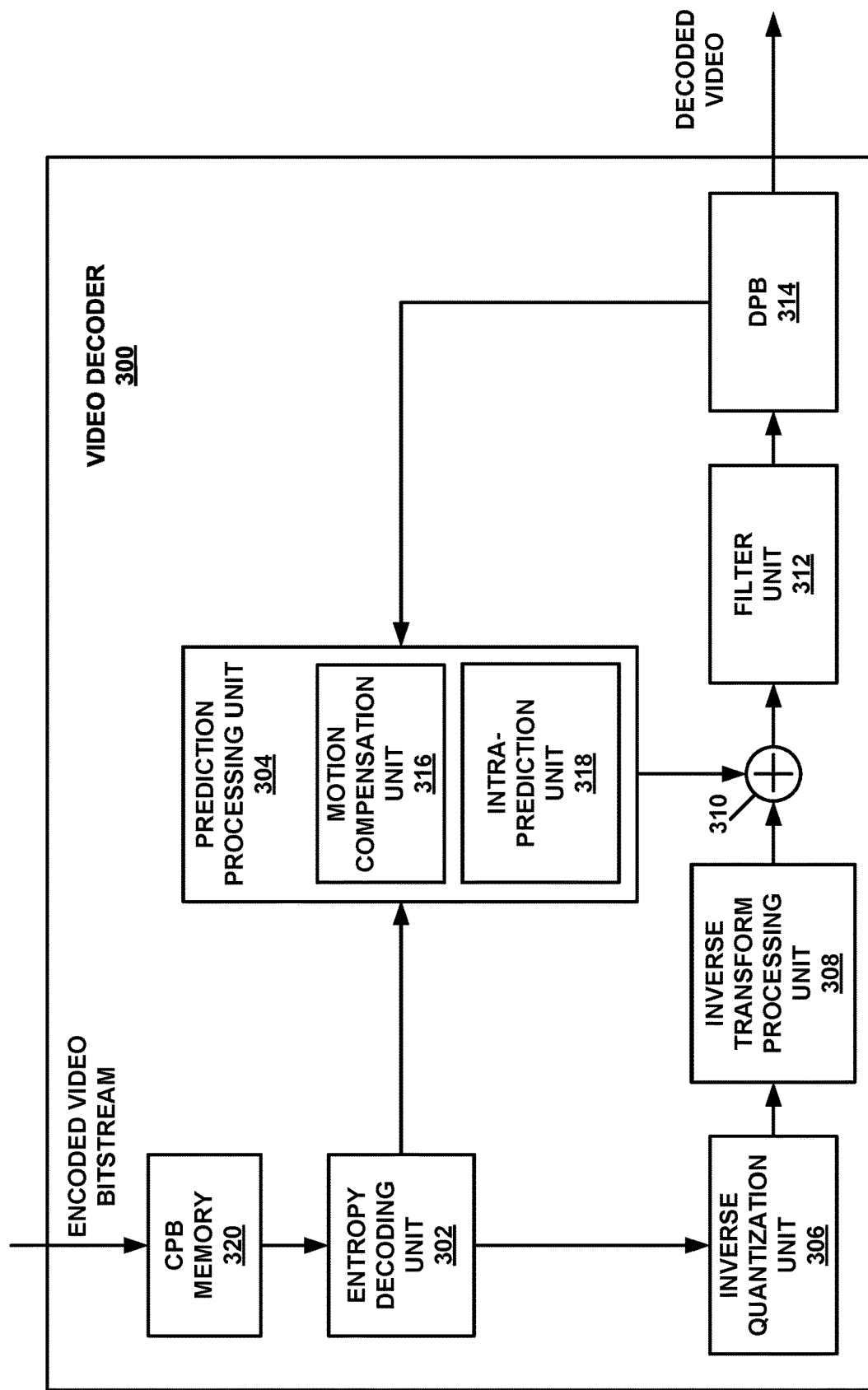
FIG. 14 is a block diagram illustrating an example video decoder that may perform the techniques of this disclosure.

FIG. 14 is a block diagram illustrating an example video decoder 300 that may perform the techniques of this disclosure. FIG. 14 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 14, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 14 are illustrated to assist with understanding the operations performed by video decoder 300. The units may be implemented as fixed-function circuits, programmable circuits, or a combination thereof. Similar to FIG. 13, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 13).

Motion compensation unit 316 may be configured to perform any of the techniques described above for determining affine merge candidates and refining and affine motion model using a base motion vector field and a guidance motion vector field as inputs to a linear regression process.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 13). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to receive a current block of video data to be decoded using an affine merge mode, determine a refined affine model for the current block of video data using a base motion vector field and a guidance motion vector field as inputs to the multivariate linear regression process, determine affine merge candidates for the current block using the refined affine model, and decode the current block of video data using the affine merge candidates.

Figure 15:
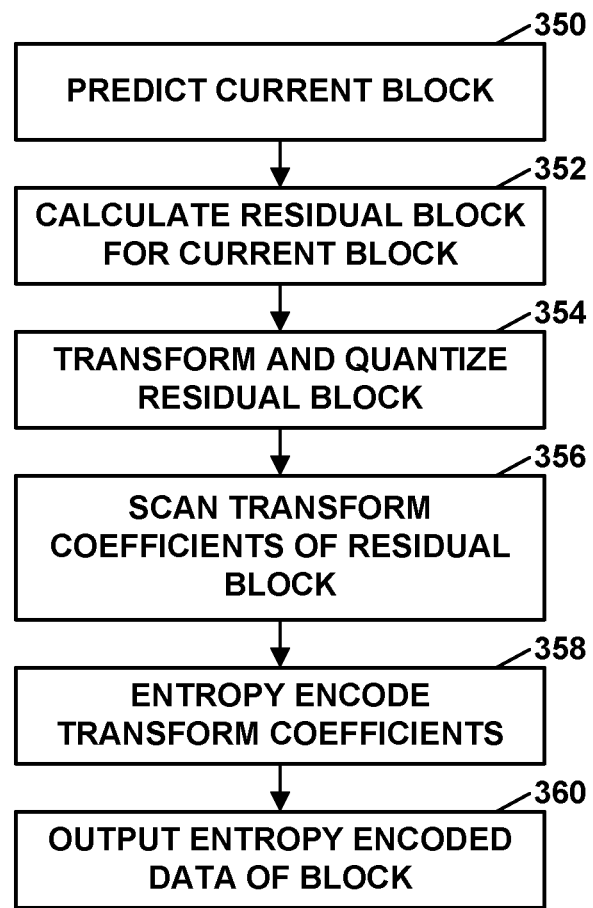
FIG. 15 is a flowchart illustrating an example method for encoding a current block in accordance with the techniques of this disclosure.

FIG. 15 is a flowchart illustrating an example method for encoding a current block in accordance with the techniques of this disclosure. The current block may comprise a current CU. Although described with respect to video encoder 200 (FIGS. 1 and 13), it should be understood that other devices may be configured to perform a method similar to that of FIG. 15.

In this example, video encoder 200 initially predicts the current block (350). For example, video encoder 200 may form a prediction block for the current block. In one or more examples of this disclosure, video encoder 200 may form a prediction block using an affine merge mode. As part of the using the affine merge mode, video encoder 200 may be configured to use combination of techniques described above for determining affine merge candidates for the affine merge mode using a multivariate linear regression method. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 16:
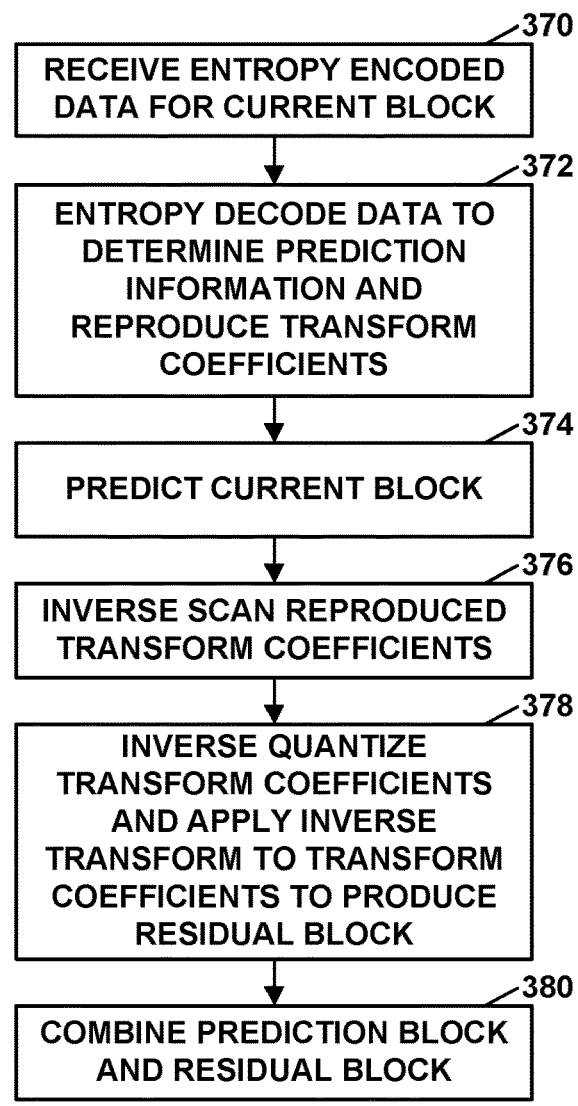
FIG. 16 is a flowchart illustrating an example method for decoding a current block in accordance with the techniques of this disclosure.

FIG. 16 is a flowchart illustrating an example method for decoding a current block of video data in accordance with the techniques of this disclosure. The current block may comprise a current CU. Although described with respect to video decoder 300 (FIGS. 1 and 14), it should be understood that other devices may be configured to perform a method similar to that of FIG. 16.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. In one or more examples of this disclosure, video decoder 300 may form the prediction block using an affine merge mode. As part of the using the affine merge mode, video decoder 300 may be configured to use combination of techniques described above for determining affine merge candidates for the affine merge mode using a multivariate linear regression method.

Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 17:
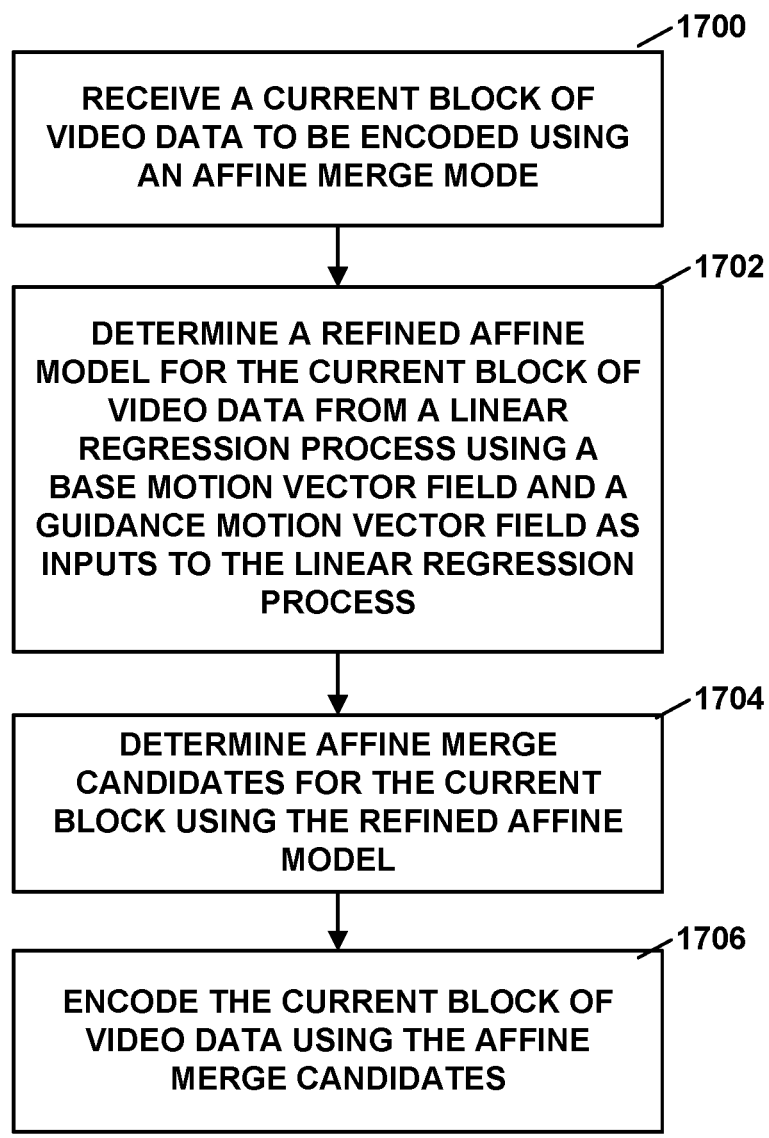
FIG. 17 is a flowchart illustrating another example method for encoding a current block in accordance with the techniques of this disclosure.

FIG. 17 is a flowchart illustrating another example method for encoding a current block in accordance with the techniques of this disclosure. The techniques of FIG. 17 may be performed by one or more structural components of video encoder 200, including motion estimation unit 222 and/or motion compensation unit 224.

In one example, of the disclosure, video encoder 200 is configured to receive a current block of video data to be encoded using an affine merge mode (1700). Video encoder 200 may determine a refined affine model for the current block of video data from a linear regression process using a base motion vector field and a guidance motion vector field as inputs to the linear regression process (1702). Video encoder 200 may then determine affine merge candidates for the current block using the refined affine model (1704), and encode the current block of video data using the affine merge candidates (1706).

In one example, video encoder 200 may determine the base motion vector field from an affine model associated with a neighboring block, and determine the guidance motion vector field from motion information associated with a plurality of sub-blocks adjacent to the current block. In one example, the plurality of sub-blocks adjacent to the current block include a first plurality of sub-blocks in a row adjacent to the current block and a second plurality of sub-blocks in a column adjacent to the current block.

In one example, the neighboring block is adjacent to the current block of video data. In another example, the neighboring block is not adjacent to the current block of video data. In another example, the affine model associated with the neighboring block is stored in a history table.

In another example, video encoder 200 is further configured to determine that the neighboring block is at a position that is outside of a distance constraint of the history table, convert a coordinate of the neighboring block to be an adjusted coordinate located within the distance constraint of the history table, and determine the affine model from a second affine model associated with a second block located at the adjusted coordinate. Video encoder 200 may also be configured to determine the base motion vector field from a subset of sub-blocks of the second block based on the second block not being fully within the distance constraint of the history table.

In another example, video encoder 200 may be configured to determine the base motion vector field from a neighboring block encoded using affine mode, and determine the guidance motion vector field from motion information associated with a subset of a plurality of sub-blocks adjacent to the current block. In another example, video encoder 200 may be configured to determine the subset of the plurality of sub-blocks adjacent to the current block based on a location of the neighboring block encoded using the affine mode.

In one example, the subset of the plurality of sub-blocks adjacent to the current block is one of a row of sub-blocks adjacent to the current block or a column of sub-blocks adjacent to the current block. In another example, the subset of the plurality of sub-blocks adjacent to the current block are within a distance constraint from the current block. In still another example, to determine the guidance motion vector field from motion information associated with the subset of the plurality of sub-blocks adjacent to the current block, video encoder 200 may be configured to sub-sample the plurality of sub-blocks adjacent to the current block.

In another example, the guidance motion vector field is a sub-block temporal motion vector predictor field.

In another example, video encoder 200 is configured to determine the base motion vector field by performing a linear regression process on two motion vector fields.

In another example, the base motion vector field includes motion information from sub-blocks that are adjacent to the current block and motion information from sub-blocks that are not adjacent to the current block.

In another example to determine the refined affine model for the current block of video data, video encoder 200 is configured to determine the refined affine model using the base motion vector field, the guidance motion vector field, and at least one other motion vector field as inputs to a linear regression process.

In another example, video encoder 200 is configured to scale motion vectors in one or more of the base motion vector field or the guidance motion vector field relative to a most frequently used reference picture index.

In another example, video encoder 200 is configured to convert a uni-directional affine merge candidate of the affine merge candidates to a bi-directional affine merge candidate.

In another example, to encode the current block, video encoder 200 is configured to determine particular affine merge candidate of the affine merge candidates, encode the current block using the particular affine merge candidate, and signal an index to video decoder 300 indicating the particular merge candidate.

Figure 18:
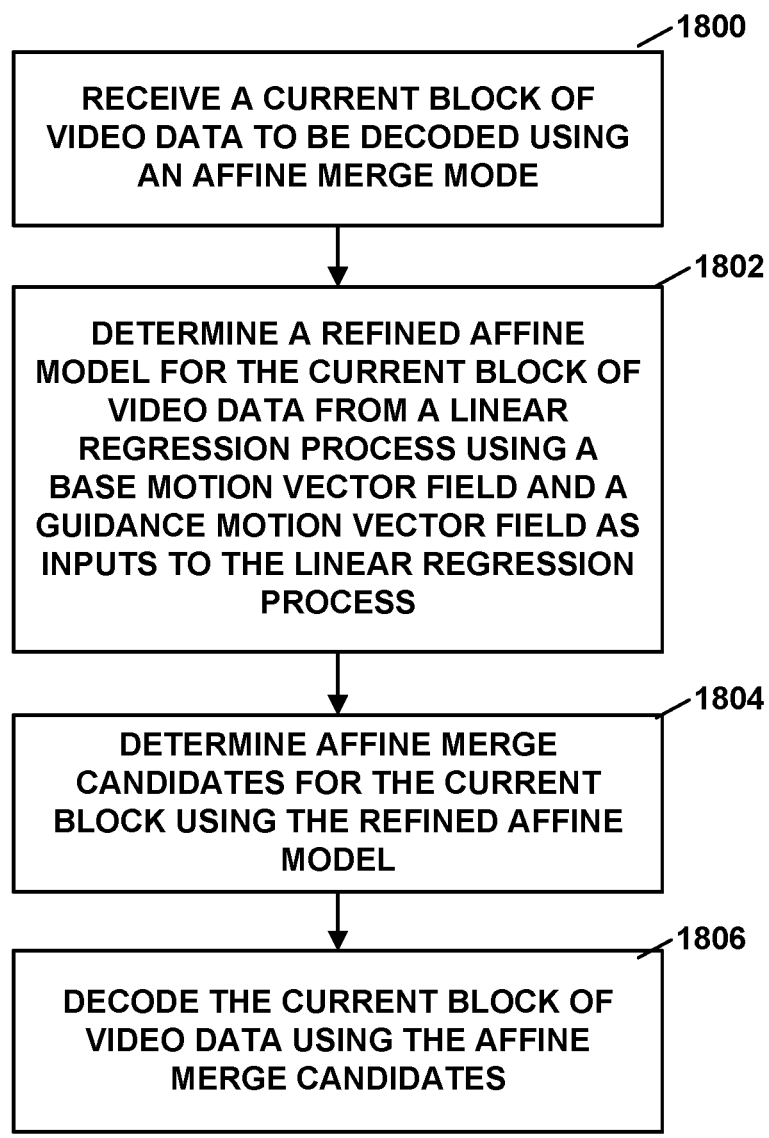
FIG. 18 is a flowchart illustrating another example method for decoding a current block in accordance with the techniques of this disclosure.

FIG. 18 is a flowchart illustrating another example method for decoding a current block in accordance with the techniques of this disclosure. The techniques of FIG. 18 may be performed by one or more structural components of video decoder 300, including motion compensation unit 316.

In one example, of the disclosure, video decoder 300 is configured to receive a current block of video data to be decoded using an affine merge mode (1800). Video decoder 300 may determine a refined affine model for the current block of video data from a linear regression process using a base motion vector field and a guidance motion vector field as inputs to the linear regression process (1802). Video decoder 300 may then determine affine merge candidates for the current block using the refined affine model (1804), and decode the current block of video data using the affine merge candidates (1806).

In one example, video decoder 300 may determine the base motion vector field from an affine model associated with a neighboring block, and determine the guidance motion vector field from motion information associated with a plurality of sub-blocks adjacent to the current block. In one example, the plurality of sub-blocks adjacent to the current block include a first plurality of sub-blocks in a row adjacent to the current block and a second plurality of sub-blocks in a column adjacent to the current block.

In one example, the neighboring block is adjacent to the current block of video data. In another example, the neighboring block is not adjacent to the current block of video data. In another example, the affine model associated with the neighboring block is stored in a history table.

In another example, video decoder 300 is further configured to determine that the neighboring block is at a position that is outside of a distance constraint of the history table, convert a coordinate of the neighboring block to be an adjusted coordinate located within the distance constraint of the history table, and determine the affine model from a second affine model associated with a second block located at the adjusted coordinate. Video decoder 300 may also be configured to determine the base motion vector field from a subset of sub-blocks of the second block based on the second block not being fully within the distance constraint of the history table.

In another example, video decoder 300 may be configured to determine the base motion vector field from a neighboring block coded using affine mode, and determine the guidance motion vector field from motion information associated with a subset of a plurality of sub-blocks adjacent to the current block. In another example, video decoder 300 may be configured to determine the subset of the plurality of sub-blocks adjacent to the current block based on a location of the neighboring block encoded using the affine mode.

In one example, the subset of the plurality of sub-blocks adjacent to the current block is one of a row of sub-blocks adjacent to the current block or a column of sub-blocks adjacent to the current block. In another example, the subset of the plurality of sub-blocks adjacent to the current block are within a distance constraint from the current block. In still another example, to determine the guidance motion vector field from motion information associated with the subset of the plurality of sub-blocks adjacent to the current block, video decoder 300 may be configured to sub-sample the plurality of sub-blocks adjacent to the current block.

In another example, the guidance motion vector field is a sub-block temporal motion vector predictor field.

In another example, video decoder 300 is configured to determine the base motion vector field by performing a linear regression process on two motion vector fields.

In another example, the base motion vector field includes motion information from sub-blocks that are adjacent to the current block and motion information from sub-blocks that are not adjacent to the current block.

In another example to determine the refined affine model for the current block of video data, video decoder 300 is configured to determine the refined affine model using the base motion vector field, the guidance motion vector field, and at least one other motion vector field as inputs to a linear regression process.

In another example, video decoder 300 is configured to scale motion vectors in one or more of the base motion vector field or the guidance motion vector field relative to a most frequently used reference picture index.

In another example, video decoder 300 is configured to convert a uni-directional affine merge candidate of the affine merge candidates to a bi-directional affine merge candidate.

In another example, to decode the current block, video decoder 300 is configured to receive an index that specifies a particular affine merge candidate of the affine merge candidates, determine a motion vector for the current block based on the particular affine merge candidate, and decode the current block using the motion vector.

Other example aspects of the disclosure are described below.

Clause 1A—A method of coding video data, the method comprising: receiving a current block of video data to be coded using an affine merge mode; determining affine merge candidates for the affine merge mode using a multivariate linear regression method; and coding the current block of video data using the affine merge candidates.

Clause 2A—The method of Clause 1A, wherein the multivariable linear regression method uses one or more motion vector fields as an input.

Clause 3A—The method of Clause 2A, wherein the multivariable linear regression produces a linear model for determining the affine merge candidates.

Clause 4A—The method of Clause 3A, the method further comprising: refining the linear model based on a motion vector field from adjacent sub-blocks to the current block.

Clause 5A—The method of Clause 3A, the method further comprising: refining the linear model based on another linear model.

Clause 6A—The method of Clause 3A, the method further comprising: deriving the linear model from two motion vector fields.

Clause 7A—The method of Clause 3A, the method further comprising: deriving the linear model from two or more motion vector fields.

Clause 8A—The method of Clause 2A, further comprising: sub-sampling one or more of the one more motion vector fields.

Clause 9A—The method of any of Clauses 2A-7A, further comprising: sub-sampling one or more of the one more motion vector fields.

Clause 10A—The method of Clause 2A, further comprising: scaling motion vectors in one or more of the one more motion vector fields relative to a most frequently used reference picture index.

Clause 11A—The method of any of Clauses 2A-9A, further comprising: scaling motion vectors in one or more of the one more motion vector fields relative to a most frequently used reference picture index.

Clause 12A—The method of any of Clauses 2A-9A, further comprising: converting a uni-directional affine merge candidate to a bi-directional affine merge candidate.

Clause 13A—The method of any of Clauses 1A-12A, wherein coding comprises decoding.

Clause 14A—The method of any of Clauses 1A-12A, wherein coding comprises encoding.

Clause 15A—A device for coding video data, the device comprising one or more means for performing the method of any of Clauses 1A-14A.

Clause 16A—The device of Clause 15A, wherein the one or more means comprise one or more processors implemented in circuitry.

Clause 17A—The device of any of Clauses 15A and 16A, further comprising a memory to store the video data.

Clause 18A—The device of any of Clauses 15A-17A, further comprising a display configured to display decoded video data.

Clause 19A—The device of any of Clauses 15A-18A, wherein the device comprises one or more of a camera, a computer, a mobile device, a broadcast receiver device, or a set-top box.

Clause 20A—The device of any of Clauses 15A-19A, wherein the device comprises a video decoder.

Clause 21A—The device of any of Clauses 15A-20A, wherein the device comprises a video encoder.

Clause 22A—A computer-readable storage medium having stored thereon instructions that, when executed, cause one or more processors to perform the method of any of Clauses 1A-14A.

Clause 1B—A method of decoding video data, the method comprising: receiving a current block of video data to be decoded using an affine merge mode; determining a refined affine model for the current block of video data from a linear regression process using a base motion vector field and a guidance motion vector field as inputs to the linear regression process; determining affine merge candidates for the current block using the refined affine model; and decoding the current block of video data using the affine merge candidates.

Clause 2B—The method of Clause 1B, further comprising: determining the base motion vector field from an affine model associated with a neighboring block; and determining the guidance motion vector field from motion information associated with a plurality of sub-blocks adjacent to the current block.

Clause 3B—The method of Clause 2B, wherein the plurality of sub-blocks adjacent to the current block include a first plurality of sub-blocks in a row adjacent to the current block and a second plurality of sub-blocks in a column adjacent to the current block.

Clause 4B—The method of Clause 2B, wherein the neighboring block is adjacent to the current block of video data.

Clause 5B—The method of Clause 2B, wherein the neighboring block is not adjacent to the current block of video data.

Clause 6B—The method of Clause 5B, wherein the affine model associated with the neighboring block is stored in a history table.

Clause 7B—The method of Clause 6B, further comprising: determining that the neighboring block is at a position that is outside of a distance constraint of the history table; converting a coordinate of the neighboring block to be an adjusted coordinate located within the distance constraint of the history table; and determining the affine model from a second affine model associated with a second block located at the adjusted coordinate.

Clause 8B—The method of Clause 7B, further comprising: determining the base motion vector field from a subset of sub-blocks of the second block based on the second block not being fully within the distance constraint of the history table.

Clause 9B—The method of any of Clauses 1B-8B, further comprising: determining the base motion vector field from a neighboring block coded using affine mode; and determining the guidance motion vector field from motion information associated with a subset of a plurality of sub-blocks adjacent to the current block.

Clause 10B—The method of Clause 9B, further comprising: determining the subset of the plurality of sub-blocks adjacent to the current block based on a location of the neighboring block coded using the affine mode.

Clause 11B—The method of Clause 9B, wherein the subset of the plurality of sub-blocks adjacent to the current block is one of a row of sub-blocks adjacent to the current block or a column of sub-blocks adjacent to the current block.

Clause 12B—The method of Clause 9B, wherein the subset of the plurality of sub-blocks adjacent to the current block are within a distance constraint from the current block.

Clause 13B—The method of Clause 9B, wherein determining the guidance motion vector field from motion information associated with the subset of the plurality of sub-blocks adjacent to the current block comprises: sub-sampling the plurality of sub-blocks adjacent to the current block.

Clause 14B—The method of any of Clauses 1B-13B, wherein the guidance motion vector field is a sub-block temporal motion vector predictor field.

Clause 15B—The method of any of Clauses 1B-13B, further comprising: determining the base motion vector field by performing a linear regression process on two motion vector fields.

Clause 16B—The method of any of Clauses 1B-13B, wherein the base motion vector field includes motion information from sub-blocks that are adjacent to the current block and motion information from sub-blocks that are not adjacent to the current block.

Clause 17B—The method of any of Clauses 1B-16B, wherein determining the refined affine model for the current block of video data comprises: determining the refined affine model using the base motion vector field, the guidance motion vector field, and at least one other motion vector field as inputs to a linear regression process.

Clause 18B—The method of any of Clauses 1B-17B, further comprising: scaling motion vectors in one or more of the base motion vector field or the guidance motion vector field relative to a most frequently used reference picture index.

Clause 19B—The method of any of Clauses 1B-18B, further comprising: converting a uni-directional affine merge candidate of the affine merge candidates to a bi-directional affine merge candidate.

Clause 20B—The method of any of Clauses 1B-19B, the method further comprising: receiving an index that specifies a particular affine merge candidate of the affine merge candidates; determining a motion vector for the current block based on the particular affine merge candidate; and decoding the current block using the motion vector.

Clause 21B—An apparatus configured to decode video data, the apparatus comprising: a memory configured to store video data; and one or more processors implemented in circuitry and in communication with the memory, the one or more processors configured to: receive a current block of video data to be decoded using an affine merge mode; determine a refined affine model for the current block of video data from a linear regression process using a base motion vector field and a guidance motion vector field as inputs to the linear regression process; determine affine merge candidates for the current block using the refined affine model; and decode the current block of video data using the affine merge candidates.

Clause 22B—The apparatus of Clause 21B, wherein the one or more processors are further configured to: determine the base motion vector field from an affine model associated with a neighboring block; and determine the guidance motion vector field from motion information associated with a plurality of sub-blocks adjacent to the current block.

Clause 23B—The apparatus of Clause 22B, wherein the plurality of sub-blocks adjacent to the current block include a first plurality of sub-blocks in a row adjacent to the current block and a second plurality of sub-blocks in a column adjacent to the current block.

Clause 24B—The apparatus of Clause 22B, wherein the neighboring block is adjacent to the current block of video data.

Clause 25B—The apparatus of Clause 22B, wherein the neighboring block is not adjacent to the current block of video data.

Clause 26B—The apparatus of Clause 25B, wherein the affine model associated with the neighboring block is stored in a history table.

Clause 27B—The apparatus of Clause 26B, wherein the one or more processors are further configured to: determine that the neighboring block is at a position that is outside of a distance constraint of the history table; convert a coordinate of the neighboring block to be an adjusted coordinate located within the distance constraint of the history table; and determine the affine model from a second affine model associated with a second block located at the adjusted coordinate.

Clause 28B—The apparatus of Clause 27B, wherein the one or more processors are further configured to: determine the base motion vector field from a subset of sub-blocks of the second block based on the second block not being fully within the distance constraint of the history table.

Clause 29B—The apparatus of any of Clauses 21B-28B, wherein the one or more processors are further configured to: determine the base motion vector field from a neighboring block coded using affine mode; and determine the guidance motion vector field from motion information associated with a subset of a plurality of sub-blocks adjacent to the current block.

Clause 30B—The apparatus of Clause 29B, wherein the one or more processors are further configured to: determine the subset of the plurality of sub-blocks adjacent to the current block based on a location of the neighboring block coded using the affine mode.

Clause 31B—The apparatus of Clause 29B, wherein the subset of the plurality of sub-blocks adjacent to the current block is one of a row of sub-blocks adjacent to the current block or a column of sub-blocks adjacent to the current block.

Clause 32B—The apparatus of Clause 29B, wherein the subset of the plurality of sub-blocks adjacent to the current block are within a distance constraint from the current block.

Clause 33B—The apparatus of Clause 29B, wherein to determine the guidance motion vector field from motion information associated with the subset of the plurality of sub-blocks adjacent to the current block, the one or more processors are further configured to: sub-sample the plurality of sub-blocks adjacent to the current block.

Clause 34B—The apparatus of any of Clauses 21B-33B, wherein the guidance motion vector field is a sub-block temporal motion vector predictor field.

Clause 35B—The apparatus of any of Clauses 21B-33B, wherein the one or more processors are further configured to: determine the base motion vector field by performing a linear regression process on two motion vector fields.

Clause 36B—The apparatus of any of Clauses 21B-33B, wherein the base motion vector field includes motion information from sub-blocks that are adjacent to the current block and motion information from sub-blocks that are not adjacent to the current block.

Clause 37B—The apparatus of any of Clauses 21B-36B, wherein to determine the refined affine model for the current block of video data, the one or more processors are further configured to: determine the refined affine model using the base motion vector field, the guidance motion vector field, and at least one other motion vector field as inputs to a linear regression process.

Clause 38B—The apparatus of any of Clauses 21B-37B, wherein the one or more processors are further configured to: scale motion vectors in one or more of the base motion vector field or the guidance motion vector field relative to a most frequently used reference picture index.

Clause 39—The apparatus of any of Clauses 21B-38B, wherein the one or more processors are further configured to: convert a uni-directional affine merge candidate of the affine merge candidates to a bi-directional affine merge candidate.

Clause 40B—The apparatus of any of Clauses 21B-39B, wherein the one or more processors are further configured to: receive an index that specifies a particular affine merge candidate of the affine merge candidates; determine a motion vector for the current block based on the particular affine merge candidate; and decode the current block using the motion vector.

Clause 41B—An apparatus for decoding video data, the apparatus comprising: means for receiving a current block of video data to be decoded using an affine merge mode; means for determining a refined affine model for the current block of video data from a linear regression process using a base motion vector field and a guidance motion vector field as inputs to the linear regression process; means for determining affine merge candidates for the current block using the refined affine model; and means for decoding the current block of video data using the affine merge candidates.

Clause 42B—A non-transitory computer-readable storage medium storing instructions that, when executed, cause one or more processors configured to decode video data to: receive a current block of video data to be decoded using an affine merge mode; determine a refined affine model for the current block of video data from a linear regression process using a base motion vector field and a guidance motion vector field as inputs to the linear regression process; determine affine merge candidates for the current block using the refined affine model; and decode the current block of video data using the affine merge candidates.

Clause 43B—A method of encoding video data, the method comprising: receiving a current block of video data to be encoded using an affine merge mode; determining a refined affine model for the current block of video data from a linear regression process using a base motion vector field and a guidance motion vector field as inputs to the linear regression process; determining affine merge candidates for the current block using the refined affine model; and encoding the current block of video data using the affine merge candidates.

Clause 44B—An apparatus configured to encode video data, the apparatus comprising: a memory configured to store video data; and one or more processors implemented in circuitry and in communication with the memory, the one or more processors configured to: receive a current block of video data to be encoded using an affine merge mode; determine a refined affine model for the current block of video data from a linear regression process using a base motion vector field and a guidance motion vector field as inputs to the linear regression process; determine affine merge candidates for the current block using the refined affine model; and encode the current block of video data using the affine merge candidates.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a current block of video data to be decoded using an affine merge mode;
   determining a base motion vector field from an affine model associated with a neighboring block;
   determining a guidance motion vector field from motion information associated with a plurality of sub-blocks adjacent to the current block;

determining a refined affine model for the current block of video data from a linear regression process using the base motion vector field and the guidance motion vector field as inputs to the linear regression process;

determining affine merge candidates for the current block using the refined affine model; and decoding the current block of video data using the affine merge candidates.

2. The method of claim 1, wherein the plurality of sub-blocks adjacent to the current block include a first plurality of sub-blocks in a row adjacent to the current block and a second plurality of sub-blocks in a column adjacent to the current block.

3. The method of claim 1, wherein the neighboring block is adjacent to the current block of video data.

4. The method of claim 1, wherein the neighboring block is not adjacent to the current block of video data.

5. The method of claim 4, wherein the affine model associated with the neighboring block is stored in a history table.

6. The method of claim 5, further comprising:
determining that the neighboring block is at a position that is outside of a distance constraint of the history table;
converting a coordinate of the neighboring block to be an adjusted coordinate located within the distance constraint of the history table; and
determining the affine model from a second affine model associated with a second block located at the adjusted coordinate.

7. The method of claim 6, further comprising:
determining the base motion vector field from a subset of sub-blocks of the second block based on the second block not being fully within the distance constraint of the history table.

8. The method of claim 1, further comprising:
determining the base motion vector field from a neighboring block coded using affine mode; and
determining the guidance motion vector field from motion information associated with a subset of a plurality of sub-blocks adjacent to the current block.

9. The method of claim 8, further comprising:
determining the subset of the plurality of sub-blocks adjacent to the current block based on a location of the neighboring block coded using the affine mode.

10. The method of claim 8, wherein the subset of the plurality of sub-blocks adjacent to the current block is one of a row of sub-blocks adjacent to the current block or a column of sub-blocks adjacent to the current block.

11. The method of claim 8, wherein the subset of the plurality of sub-blocks adjacent to the current block are within a distance constraint from the current block.

12. The method of claim 8, wherein determining the guidance motion vector field from motion information associated with the subset of the plurality of sub-blocks adjacent to the current block comprises:
sub-sampling the plurality of sub-blocks adjacent to the current block.

13. The method of claim 1, wherein the guidance motion vector field is a sub-block temporal motion vector predictor field.

14. The method of claim 1, further comprising:
determining the base motion vector field by performing a linear regression process on two motion vector fields.

15. The method of claim 1, wherein the base motion vector field includes motion information from sub-blocks that are adjacent to the current block and motion information from sub-blocks that are not adjacent to the current block.

16. The method of claim 1, wherein determining the refined affine model for the current block of video data comprises:
determining the refined affine model using the base motion vector field, the guidance motion vector field, and at least one other motion vector field as inputs to a linear regression process.

17. The method of claim 1, further comprising:
scaling motion vectors in one or more of the base motion vector field or the guidance motion vector field relative to a most frequently used reference picture index.

18. The method of claim 1, further comprising:
converting a uni-directional affine merge candidate of the affine merge candidates to a bi-directional affine merge candidate.

19. The method of claim 1, the method further comprising:
receiving an index that specifies a particular affine merge candidate of the affine merge candidates;
determining a motion vector for the current block based on the particular affine merge candidate; and
decoding the current block using the motion vector.

20. An apparatus configured to decode video data, the apparatus comprising:
a memory configured to store video data; and
one or more processors implemented in circuitry and in communication with the memory, the one or more processors configured to:
receive a current block of video data to be decoded using an affine merge mode;
determine a base motion vector field from an affine model associated with a neighboring block;
determine a guidance motion vector field from motion information associated with a plurality of sub-blocks adjacent to the current block;
determine a refined affine model for the current block of video data from a linear regression process using the base motion vector field and the guidance motion vector field as inputs to the linear regression process;
determine affine merge candidates for the current block using the refined affine model; and
decode the current block of video data using the affine merge candidates.

21. The apparatus of claim 20, wherein the plurality of sub-blocks adjacent to the current block include a first plurality of sub-blocks in a row adjacent to the current block and a second plurality of sub-blocks in a column adjacent to the current block.

22. The apparatus of claim 20, wherein the neighboring block is adjacent to the current block of video data.

23. The apparatus of claim 20, wherein the neighboring block is not adjacent to the current block of video data.

24. The apparatus of claim 23, wherein the affine model associated with the neighboring block is stored in a history table.

25. The apparatus of claim 24, wherein the one or more processors are further configured to:
determine that the neighboring block is at a position that is outside of a distance constraint of the history table;
convert a coordinate of the neighboring block to be an adjusted coordinate located within the distance constraint of the history table; and
determine the affine model from a second affine model associated with a second block located at the adjusted coordinate.

26. The apparatus of claim 25, wherein the one or more processors are further configured to:

determine the base motion vector field from a subset of sub-blocks of the second block based on the second block not being fully within the distance constraint of the history table.

27. The apparatus of claim 20, wherein the one or more processors are further configured to:
determine the base motion vector field from a neighboring block coded using affine mode; and
determine the guidance motion vector field from motion information associated with a subset of a plurality of sub-blocks adjacent to the current block.

28. The apparatus of claim 27, wherein the one or more processors are further configured to:
determine the subset of the plurality of sub-blocks adjacent to the current block based on a location of the neighboring block coded using the affine mode.

29. The apparatus of claim 27, wherein the subset of the plurality of sub-blocks adjacent to the current block is one of a row of sub-blocks adjacent to the current block or a column of sub-blocks adjacent to the current block.

30. The apparatus of claim 27, wherein the subset of the plurality of sub-blocks adjacent to the current block are within a distance constraint from the current block.

31. The apparatus of claim 27, wherein to determine the guidance motion vector field from motion information associated with the subset of the plurality of sub-blocks adjacent to the current block, the one or more processors are further configured to:
sub-sample the plurality of sub-blocks adjacent to the current block.

32. The apparatus of claim 20, wherein the guidance motion vector field is a sub-block temporal motion vector predictor field.

33. The apparatus of claim 20, wherein the one or more processors are further configured to:
determine the base motion vector field by performing a linear regression process on two motion vector fields.

34. The apparatus of claim 20, wherein the base motion vector field includes motion information from sub-blocks that are adjacent to the current block and motion information from sub-blocks that are not adjacent to the current block.

35. The apparatus of claim 20, wherein to determine the refined affine model for the current block of video data, the one or more processors are further configured to:
determine the refined affine model using the base motion vector field, the guidance motion vector field, and at least one other motion vector field as inputs to a linear regression process.

36. The apparatus of claim 20, wherein the one or more processors are further configured to:
scale motion vectors in one or more of the base motion vector field or the guidance motion vector field relative to a most frequently used reference picture index.

37. The apparatus of claim 20, wherein the one or more processors are further configured to:
convert a uni-directional affine merge candidate of the affine merge candidates to a bi-directional affine merge candidate.

38. The apparatus of claim 20, wherein the one or more processors are further configured to:
receive an index that specifies a particular affine merge candidate of the affine merge candidates;
determine a motion vector for the current block based on the particular affine merge candidate; and
decode the current block using the motion vector.

39. An apparatus for decoding video data, the apparatus comprising:

means for receiving a current block of video data to be decoded using an affine merge mode;
means for determining a base motion vector field from an affine model associated with a neighboring block;
means for determining a guidance motion vector field from motion information associated with a plurality of sub-blocks adjacent to the current block;
means for determining a refined affine model for the current block of video data from a linear regression process using the base motion vector field and the guidance motion vector field as inputs to the linear regression process;
means for determining affine merge candidates for the current block using the refined affine model; and
means for decoding the current block of video data using the affine merge candidates.

40. A non-transitory computer-readable storage medium storing instructions that, when executed, cause one or more processors configured to decode video data to:
receive a current block of video data to be decoded using an affine merge mode;
determine a base motion vector field from an affine model associated with a neighboring block;
determine a guidance motion vector field from motion information associated with a plurality of sub-blocks adjacent to the current block;
determine a refined affine model for the current block of video data from a linear regression process using the base motion vector field and the guidance motion vector field as inputs to the linear regression process;
determine affine merge candidates for the current block using the refined affine model; and
decode the current block of video data using the affine merge candidates.

41. A method of encoding video data, the method comprising:
receiving a current block of video data to be encoded using an affine merge mode;
determining a base motion vector field from an affine model associated with a neighboring block;
determining a guidance motion vector field from motion information associated with a plurality of sub-blocks adjacent to the current block;
determining a refined affine model for the current block of video data from a linear regression process using the base motion vector field and the guidance motion vector field as inputs to the linear regression process;
determining affine merge candidates for the current block using the refined affine model; and
encoding the current block of video data using the affine merge candidates.

42. An apparatus configured to encode video data, the apparatus comprising:
a memory configured to store video data; and
one or more processors implemented in circuitry and in communication with the memory, the one or more processors configured to:
receive a current block of video data to be encoded using an affine merge mode;
determine a base motion vector field from an affine model associated with a neighboring block;
determine a guidance motion vector field from motion information associated with a plurality of sub-blocks adjacent to the current block;
determine a refined affine model for the current block of video data from a linear regression process using the base motion vector field and the guidance motion vector field as inputs to the linear regression process;

determine affine merge candidates for the current block using the refined affine model; and encode the current block of video data using the affine merge candidates.

43. The method of claim 1, further comprising:

determining that a coordinate of the neighboring block is beyond a distance relative to a coordinate of the current block;

converting the coordinate of the neighboring block to be an adjusted coordinate located within the distance relative to the coordinate of the current block; and determining the affine model from a second affine model associated with a second block located at the adjusted coordinate.

44. The apparatus of claim 23, wherein the one or more processors are further configured to:

determine that a coordinate of the neighboring block is beyond a distance relative to a coordinate of the current block;

convert the coordinate of the neighboring block to be an adjusted coordinate located within the distance relative to the coordinate of the current block; and determine the affine model from a second affine model associated with a second block located at the adjusted coordinate.

45. The method of claim 41, further comprising:

determining that a coordinate of the neighboring block is beyond a distance relative to a coordinate of the current block;

converting the coordinate of the neighboring block to be an adjusted coordinate located within the distance relative to the coordinate of the current block; and determining the affine model from a second affine model associated with a second block located at the adjusted coordinate.

46. The apparatus of claim 42, wherein the one or more processors are further configured to:

determine that a coordinate of the neighboring block is beyond a distance relative to a coordinate of the current block;

convert the coordinate of the neighboring block to be an adjusted coordinate located within the distance relative to the coordinate of the current block; and determine the affine model from a second affine model associated with a second block located at the adjusted coordinate.

* * * * *